(12) United States Patent
Mondet et al.

(10) Patent No.: US 12,069,510 B2
(45) Date of Patent: Aug. 20, 2024

(54) TRAFFIC AND FEEDBACK MANAGEMENT BASED ON FRAME DECODING

(71) Applicant: QUALCOMM Incorporated, San Diego, CA (US)

(72) Inventors: Mickael Mondet, Louannec (FR); Hyun Yong Lee, San Diego, CA (US); Prashanth Haridas Hande, San Diego, CA (US); Peerapol Tinnakornsrisuphap, San Diego, CA (US); Yih-Hao Lin, San Diego, CA (US); Chih-Ping Li, San Diego, CA (US); Ravi Agarwal, San Diego, CA (US); Amira Alloum, Boulogne-Billancourt (FR)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/453,788

(22) Filed: Nov. 5, 2021

(65) Prior Publication Data
US 2023/0144525 A1 May 11, 2023

(51) Int. Cl.
*H04W 28/02* (2009.01)
*H04L 1/1607* (2023.01)
*H04W 52/02* (2009.01)

(52) U.S. Cl.
CPC ....... *H04W 28/0289* (2013.01); *H04L 1/1607* (2013.01); *H04W 52/0235* (2013.01)

(58) Field of Classification Search
CPC ......... H04W 28/0289; H04W 52/0235; H04W 52/0216; H04W 52/0229; H04L 1/1607; H04L 1/1848; Y02D 30/70
See application file for complete search history.

(56) References Cited

U.S. PATENT DOCUMENTS

| | | | |
|---|---|---|---|
| 10,404,427 B2* | 9/2019 | Kim | H04L 5/0032 |
| 10,834,673 B2* | 11/2020 | Martin | H04W 72/51 |
| 11,212,867 B2* | 12/2021 | Kim | H04W 76/19 |
| 2021/0211242 A1* | 7/2021 | Andgart | H04L 1/1864 |
| 2021/0367888 A1* | 11/2021 | Ramamurthi | H04W 28/0289 |
| 2022/0132476 A1* | 4/2022 | Yamamoto | H04W 72/23 |
| 2023/0071767 A1* | 3/2023 | Zhou | H04L 1/1607 |

* cited by examiner

*Primary Examiner* — Eunsook Choi
(74) *Attorney, Agent, or Firm* — QUALCOMM Incorporated

(57) ABSTRACT

Various aspects of the present disclosure generally relate to wireless communication. In some aspects, a user equipment (UE) may determine that the UE has received, from a network, a sufficient quantity of protocol data units (PDUs) to decode a frame. Accordingly, the UE may indicate, to the network, that the UE has decoded the frame. Similarly, the UE may determine that the network has received, from the UE, a sufficient quantity of PDUs to decode a frame. Accordingly, the UE may refrain from transmitting one or more additional PDUs associated with the frame. Additionally, or alternatively, the UE may receive, from the network, an indication to disable some feedback to the network. Accordingly, the UE may refrain from transmitting one or more feedback signals based at least in part on the indication. Numerous other aspects are described.

28 Claims, 19 Drawing Sheets

TRAFFIC AND FEEDBACK MANAGEMENT BASED ON FRAME DECODING

FIELD OF THE DISCLOSURE

Aspects of the present disclosure generally relate to wireless communication and to techniques and apparatuses for traffic and feedback management based on frame decoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining that the UE has received, from a network, a sufficient quantity of protocol data units (PDUs) to decode a frame. The method may include indicating, to the network, that the UE has decoded the frame.

Some aspects described herein relate to a method of wireless communication performed by a base station. The method may include determining that a UE has received, from the base station, a sufficient quantity of PDUs to decode a frame. The method may include refraining from transmitting one or more additional PDUs associated with the frame.

Some aspects described herein relate to a method of wireless communication performed by a UE. The method may include determining that a network has received, from the UE, a sufficient quantity of PDUs to decode a frame. The method may include refraining from transmitting one or more additional PDUs associated with the frame.

Some aspects described herein relate to a method of wireless communication performed by a base station. The method may include determining that the base station has received, from a UE, a sufficient quantity of PDUs to decode a frame. The method may include indicating, to the UE, that the base station has decoded the frame.

Some aspects described herein relate to a method of wireless communication performed by a UE. The method may include receiving, from a network, an indication to disable some feedback to the network. The method may include refraining from transmitting one or more feedback signals based at least in part on the indication.

Some aspects described herein relate to a method of wireless communication performed by a base station. The method may include transmitting, to a UE, an indication to disable some feedback from the UE. The method may include refraining from monitoring an uplink control channel with the UE based at least in part on the indication.

Some aspects described herein relate to an apparatus for wireless communication at a UE. The apparatus may include a memory and one or more processors coupled to the memory. The one or more processors may be configured to determine that the UE has received, from a network, a sufficient quantity of PDUs to decode a frame. The one or more processors may be configured to indicate, to the network, that the UE has decoded the frame.

Some aspects described herein relate to an apparatus for wireless communication at a base station. The apparatus may include a memory and one or more processors coupled to the memory. The one or more processors may be configured to determine that a UE has received, from the base station, a sufficient quantity of PDUs to decode a frame. The one or more processors may be configured to refrain from transmitting one or more additional PDUs associated with the frame.

Some aspects described herein relate to an apparatus for wireless communication at a UE. The apparatus may include a memory and one or more processors coupled to the memory. The one or more processors may be configured to determine that a network has received, from the UE, a sufficient quantity of PDUs to decode a frame. The one or more processors may be configured to refrain from transmitting one or more additional PDUs associated with the frame.

Some aspects described herein relate to an apparatus for wireless communication at a base station. The apparatus may include a memory and one or more processors coupled to the memory. The one or more processors may be configured to determine that the base station has received, from a UE, a sufficient quantity of PDUs to decode a frame. The one or more processors may be configured to indicate, to the UE, that the base station has decoded the frame.

Some aspects described herein relate to an apparatus for wireless communication at a UE. The apparatus may include a memory and one or more processors coupled to the memory. The one or more processors may be configured to receive, from a network, an indication to disable some feedback to the network. The one or more processors may be configured to refrain from transmitting one or more feedback signals based at least in part on the indication.

Some aspects described herein relate to an apparatus for wireless communication at a base station. The apparatus may include a memory and one or more processors coupled to the memory. The one or more processors may be configured to transmit, to a UE, an indication to disable some feedback from the UE. The one or more processors may be configured to refrain from monitoring an uplink control channel with the UE based at least in part on the indication.

Some aspects described herein relate to a non-transitory computer-readable medium that stores a set of instructions for wireless communication by a UE. The set of instructions, when executed by one or more processors of the UE, may cause the UE to determine that the UE has received, from a network, a sufficient quantity of PDUs to decode a frame. The set of instructions, when executed by one or more processors of the UE, may cause the UE to indicate, to the network, that the UE has decoded the frame.

Some aspects described herein relate to a non-transitory computer-readable medium that stores a set of instructions for wireless communication by a base station. The set of instructions, when executed by one or more processors of the base station, may cause the base station to determine that a UE has received, from the base station, a sufficient quantity of PDUs to decode a frame. The set of instructions, when executed by one or more processors of the base station, may cause the base station to refrain from transmitting one or more additional PDUs associated with the frame.

Some aspects described herein relate to a non-transitory computer-readable medium that stores a set of instructions for wireless communication by a UE. The set of instructions, when executed by one or more processors of the UE, may cause the UE to determine that a network has received, from the UE, a sufficient quantity of PDUs to decode a frame. The set of instructions, when executed by one or more processors of the UE, may cause the UE to refrain from transmitting one or more additional PDUs associated with the frame.

Some aspects described herein relate to a non-transitory computer-readable medium that stores a set of instructions for wireless communication by a base station. The set of instructions, when executed by one or more processors of the base station, may cause the base station to determine that the base station has received, from a UE, a sufficient quantity of PDUs to decode a frame. The set of instructions, when executed by one or more processors of the base station, may cause the base station to indicate, to the UE, that the base station has decoded the frame.

Some aspects described herein relate to a non-transitory computer-readable medium that stores a set of instructions for wireless communication by a UE. The set of instructions, when executed by one or more processors of the UE, may cause the UE to receive, from a network, an indication to disable some feedback to the network. The set of instructions, when executed by one or more processors of the UE, may cause the UE to refrain from transmitting one or more feedback signals based at least in part on the indication.

Some aspects described herein relate to a non-transitory computer-readable medium that stores a set of instructions for wireless communication by a base station. The set of instructions, when executed by one or more processors of the base station, may cause the base station to transmit, to a UE, an indication to disable some feedback from the UE. The set of instructions, when executed by one or more processors of the base station, may cause the base station to refrain from monitoring an uplink control channel with the UE based at least in part on the indication.

Some aspects described herein relate to an apparatus for wireless communication. The apparatus may include means for determining that the apparatus has received, from a network, a sufficient quantity of PDUs to decode a frame. The apparatus may include means for indicating, to the network, that the apparatus has decoded the frame.

Some aspects described herein relate to an apparatus for wireless communication. The apparatus may include means for determining that a UE has received, from the apparatus, a sufficient quantity of PDUs to decode a frame. The apparatus may include means for refraining from transmitting one or more additional PDUs associated with the frame.

Some aspects described herein relate to an apparatus for wireless communication. The apparatus may include means for determining that a network has received, from the apparatus, a sufficient quantity of PDUs to decode a frame. The apparatus may include means for refraining from transmitting one or more additional PDUs associated with the frame.

Some aspects described herein relate to an apparatus for wireless communication. The apparatus may include means for determining that the apparatus has received, from a UE, a sufficient quantity of PDUs to decode a frame. The apparatus may include means for indicating, to the UE, that the apparatus has decoded the frame.

Some aspects described herein relate to an apparatus for wireless communication. The apparatus may include means for receiving, from a network, an indication to disable some feedback to the network. The apparatus may include means for refraining from transmitting one or more feedback signals based at least in part on the indication.

Some aspects described herein relate to an apparatus for wireless communication. The apparatus may include means for transmitting, to a UE, an indication to disable some feedback from the UE. The apparatus may include means for refraining from monitoring an uplink control channel with the UE based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
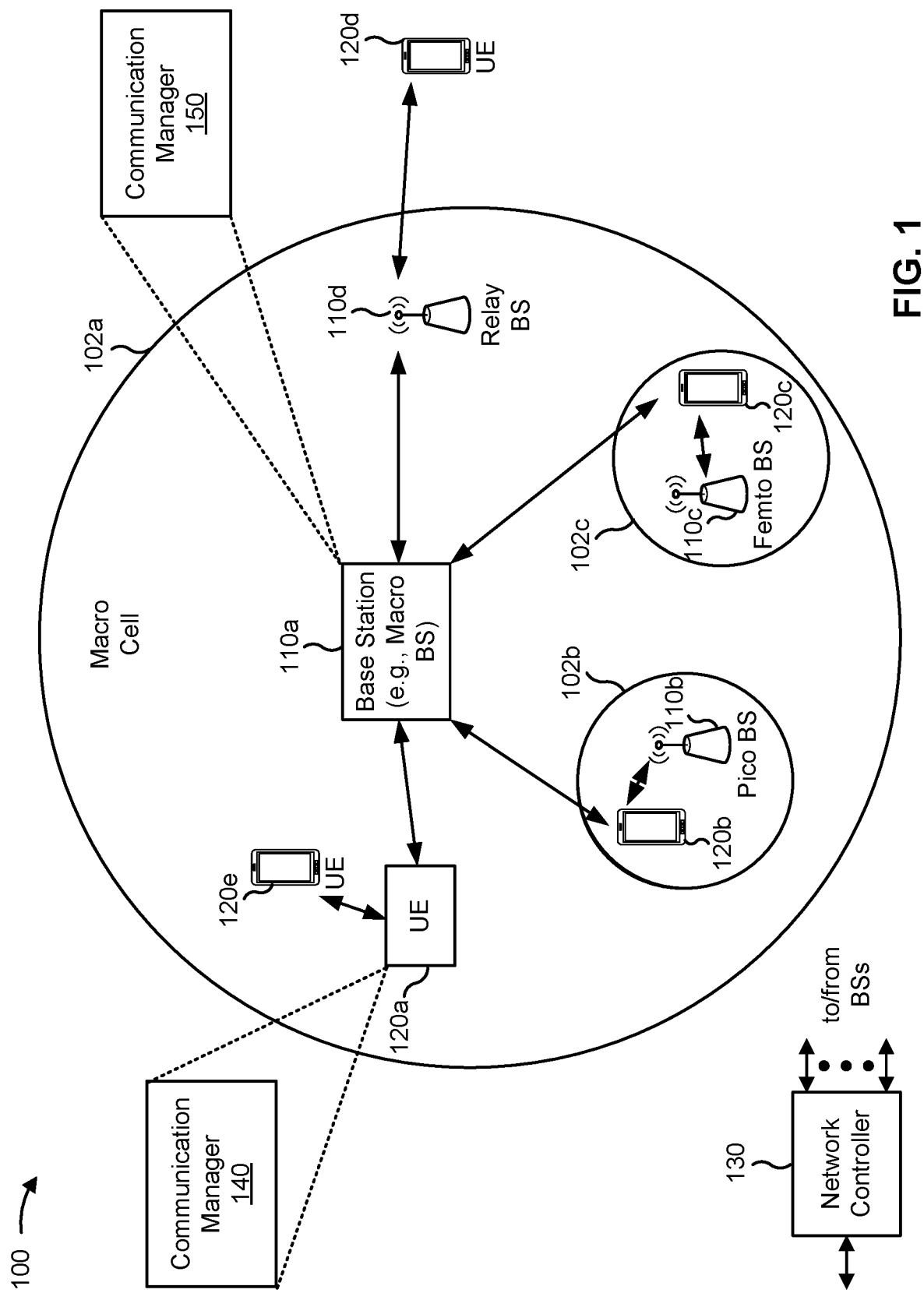
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine that the UE has received (e.g., from the base station 110) a sufficient quantity of protocol data units (PDUs) to decode a frame and indicate (e.g., to the base station 10) that the UE 120 has decoded the frame. Additionally, or alternatively, the communication manager 140 may determine that the base station 110 has received (e.g., from the UE 120) a sufficient quantity of PDUs to decode a frame and refrain from transmitting one or more additional PDUs associated with the frame. Additionally, or alternatively, the communication manager 140 may receive (e.g., from the base station 110) an indication to disable some feedback to the network and refrain from transmitting one or more feedback signals based at least in part on the indication. Additionally, or alternatively, the communication manager 140 may perform one or more other operations described herein.

In some aspects, the base station 110 may include a communication manager 150. As described in more detail elsewhere herein, the communication manager 150 may determine that the UE 120 has received, from the base station, a sufficient quantity of PDUs to decode a frame and refrain from transmitting one or more additional PDUs associated with the frame. Additionally, or alternatively, the communication manager 150 may determine that the base station 110 has received (e.g., from the UE 120) a sufficient quantity of PDUs to decode a frame and indicate (e.g., to the UE 120) that the base station 110 has decoded the frame.

Additionally, or alternatively, the communication manager 150 may transmit (e.g., to the UE 120) an indication to disable some feedback from the UE 120 and refrain from monitoring an uplink control channel with the UE 120 based at least in part on the indication. Additionally, or alternatively, the communication manager 150 may perform one or more other operations described herein.

As indicated above, FIG. 1 is provided as an example. Other examples may differ from what is described with regard to FIG. 1.

Figure 2:
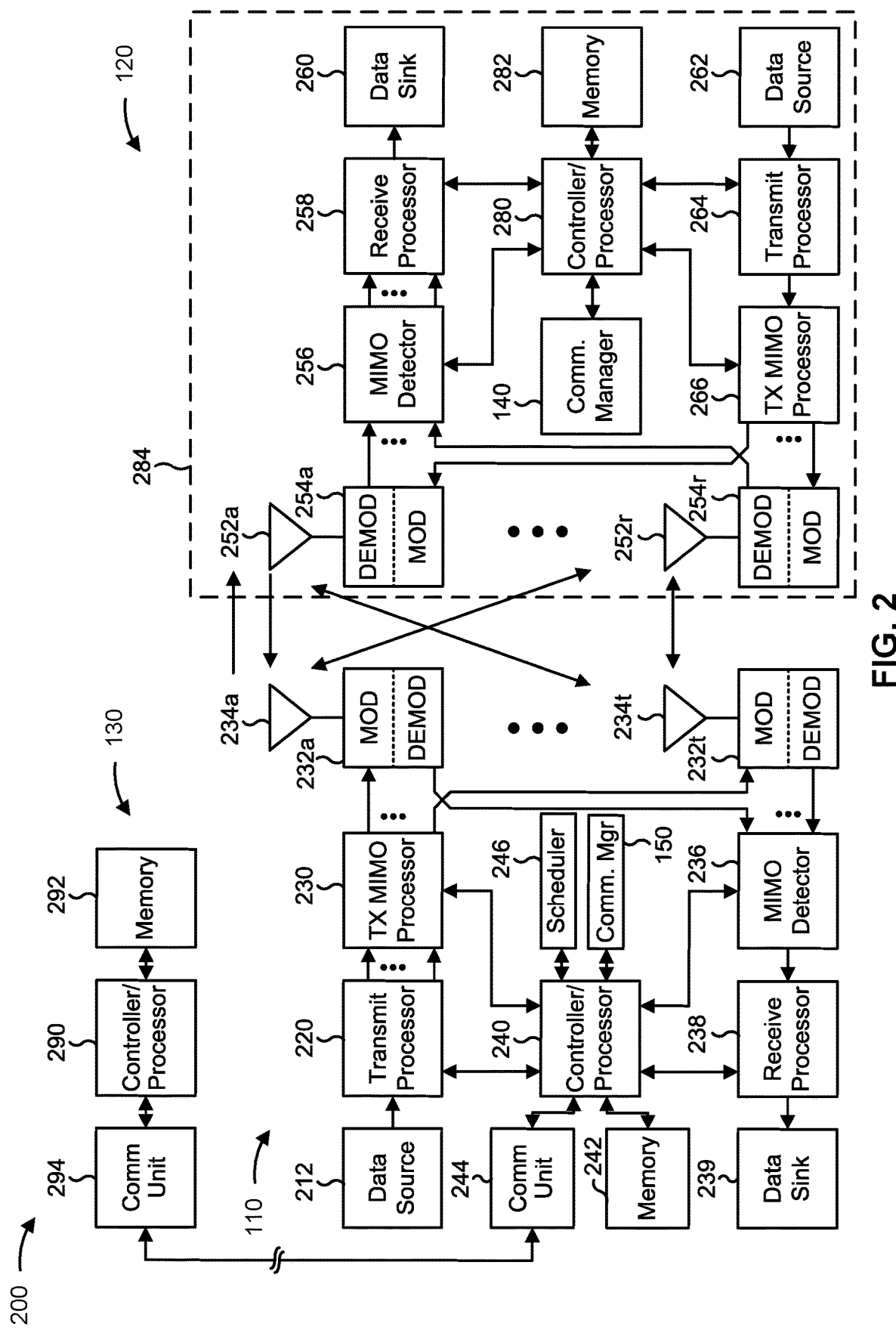
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector

256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-16).

The controller/processor 240 of the base station 110, the controller/processor 280 of the UE 120, and/or any other component(s) of FIG. 2 may perform one or more techniques associated with traffic and feedback management based on frame decoding, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 1500 of FIG. 15) may include means for determining that the UE has received, from a network, a sufficient quantity of PDUs to decode a frame; and/or means for indicating, to the network, that the UE has decoded the frame. Additionally, or alternatively, the UE may include means for determining that the network has received, from the UE, a sufficient quantity of PDUs to decode a frame; and/or means for refraining from transmitting one or more additional PDUs associated with the frame. Additionally, or alternatively, the UE may include means for receiving, from the network, an indication to disable some feedback to the network; and/or means for refraining from transmitting one or more feedback signals based at least in part on the indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110 and/or apparatus 1600 of FIG. 16) may include means for determining that a UE has received, from the base station, a sufficient quantity of PDUs to decode a frame; and/or means for refraining from transmitting one or more additional PDUs associated with the frame. Additionally, or alternatively, the base station may include means for determining that the base station has received, from the UE, a sufficient quantity of PDUs to decode a frame; and/or means for indicating, to the UE, that the base station has decoded the frame. Additionally, or alternatively, the base station may include means for transmitting, to the UE, an indication to disable some feedback from the UE; and/or means for refraining from monitoring an uplink control channel with the UE based at least in part on the indication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Using network coding allows for a UE and a base station to replace retransmission with error correction. For example, in network coding, an encoder (or transmitter), such as the base station on a downlink or the UE on an uplink, may encode data, such as a set of source packets or original packets, into a set of encoded packets using network coding. As used herein, "packet" may refer to a service data unit (SDU) that is encoded and decoded by a medium access control (MAC) layer, a radio link control (RLC) layer, or another higher layer, or may refer to a protocol data unit (PDU) that is encoded and decoded by a physical (PHY) layer or another lower layer. An encoded packet may be the same as a source packet, may be a redundancy version of a source packet, may include a combination of multiple source packets (e.g., a subset of the source packets), and/or may include a redundancy version of the combination. The number of encoded packets may be the same as or different than the number of source packets. In some aspects, the number of encoded packets may be unlimited (e.g., the encoder may generate any number of encoded packets), such as when using a rateless network coding scheme. For example, the encoder may encode K source packets (where K=3) into N encoded packets (where N=4). The encoder transmits the encoded packets to a decoder (or receiver), such as the base station on an uplink or the UE on a downlink. The decoder uses network coding to decode the encoded packets and recover the source packets. As used herein, network coding may be performed using any type of network coding scheme, such as fountain coding, linear network coding, random linear network coding, Luby transform (LT) network coding, and/or Raptor network coding. Thus, the decoder can obtain the source packets even when some transmissions fail, and using less overhead than packet data convergence protocol (PDCP) duplication. For example, PDCP duplication may duplicate all of the source packets, while the example network coding uses fewer packets.

Another option for error correction is to use forward error correction (FEC) such that the decoder can recover the source packets, even when a channel between the transmitter and receiver is noisy, using one or more error correction codes (ECCs) encoded with the packets. For example, FEC may use an erasure coding scheme, such as Reed-Solomon codes or other maximum distance separable (MDS) codes. For example, the encoder may apply a generator matrix (e.g., represented by A) to the source packets (e.g., represented by a, b, and c) to generate the encoded packets. In one example, the generator matrix may be of a form similar to $$\begin{bmatrix} 1 & 0 & 0 \\ 0 & 1 & 0 \\ 0 & 0 & 1 \\ 1 & 1 & 1 \\ 1 & \alpha & \alpha^2 \end{bmatrix},$$

where $\alpha$ represents a coefficient, such that the encoded packets may be represented by a, b, c, a+b+c, and a+$\alpha$b+$\alpha^2$c. Other erasure coding schemes may include applying different generator matrices to the source packets to generate different encoded packets. Similar to network coding, by using FEC, the decoder can obtain the source packets while using less overhead than PDCP duplication.

When using network coding or FEC, a receiver (such as a UE on a downlink or a base station on an uplink) may successfully decode a frame of data before receiving all of the encoded packets from the transmitter (such as the UE on an uplink or the base station on a downlink). Accordingly, the transmitter wastes power, processing resources, and network resources by transmitting additional encoded packets that are not necessary. Additionally, the receiver may waste power and processing resources by monitoring for, and receiving, the additional encoded packets that are not necessary.

Some techniques and apparatuses described herein enable a base station (e.g., base station 110) to refrain from transmitting one or more additional PDUs by determining that a UE (e.g., UE 120) has received a sufficient quantity of PDUs to decode a frame associated with the additional PDU(s). For example, the UE 120 may indicate, to the base station 110, that the UE 120 has successfully decoded the frame. Additionally, or alternatively, the base station 110 may determine that the UE 120 has received the sufficient quantity of PDUs (e.g., using feedback from the UE 120). As a result, the base station 110 conserves power, processing resources, and network resources by not transmitting the additional PDU(s). Additionally, the UE 120 may conserve power and processing resources by not monitoring for, and receiving, the additional PDU(s).

Similarly, some techniques and apparatuses described herein enable the UE 120 to refrain from transmitting one or more additional PDUs by determining that the base station 110 has received a sufficient quantity of PDUs to decode a frame associated with the additional PDU(s). For example, the base station 110 may indicate, to the UE 120, that the base station 110 has successfully decoded the frame. As a result, the UE 120 conserves power, processing resources, and network resources by not transmitting the additional PDU(s). Additionally, the base station 110 may conserve power and processing resources by not monitoring for, and receiving, the additional PDU(s).

Figure 3:
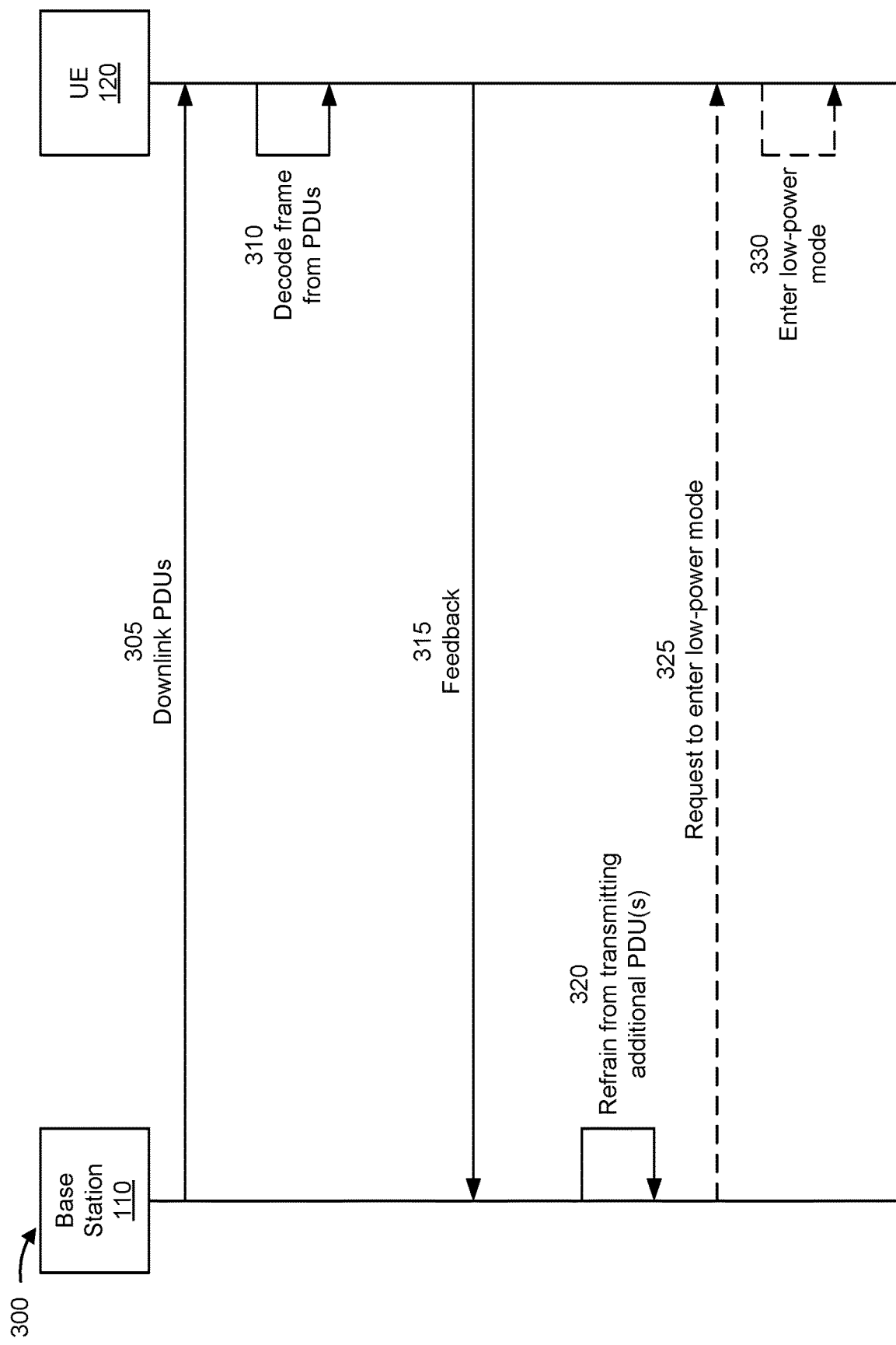
FIG. 3 is a diagram illustrating an example associated with downlink traffic management based on frame decoding, in accordance with the present disclosure.

FIG. 3 is a diagram illustrating an example 300 associated with downlink traffic management based on frame decoding, in accordance with the present disclosure. As shown in FIG. 3, a base station 110 and a UE 120 may communicate with one another.

As shown by reference number 305, the base station 110 may transmit, and the UE 120 may receive, one or more packets (e.g., one or more PDUs/SDUs) associated with a frame of data. For example, the base station 110 may receive the frame of data from an application (e.g., as described in connection with FIGS. 4A, 4B, 5A, and/or 5B) for transmission over-the-air (OTA) to the UE 120. Accordingly, the base station 110 may encode the frame as one or more packets.

The base station 110 may apply network coding or FEC such that the one or more packets are one or more encoded packets from which the UE 120 may decode the frame of data. Accordingly, as shown by reference number 310, the UE 120 may decode the data from the PDU(s)/SDU(s) received from the base station 110. The decoding may occur at an application (e.g., as described in connection with FIGS. 4A and/or 5A) or at an access stratum of the UE 120 (e.g., as described in connection with FIGS. 4B and/or 5B).

As shown by reference number 315, the UE 120 may transmit, and the base station 110 may receive, feedback associated with the frame. In some aspects, the feedback may include acknowledgement (ACK) and/or negative-acknowledgement (NACK) signals such that the base station 110 may determine that the UE 120 has received a sufficient quantity of PDUs (or SDUs) to decode the frame. The sufficient quantity may be indicated by the application that generated the frame (e.g., as described in connection with FIGS. 4A and/or 5A) and/or determined at an access stratum of the base station 110 (e.g., as described in connection with FIGS. 4B and/or 5B). Accordingly, the base station 110 may determine that the UE 120 has received the sufficient quantity of PDUs (or SDUs) by comparing a quantity of the feedback signals, from the UE 120, to the sufficient quantity to decode the frame.

In some aspects, the base station 110 may transmit, and the UE 120 may receive, a configuration message associated with conditional deactivation of feedback (e.g., as described in connection with FIG. 8). Accordingly, the base station 110 may determine that the UE 120 has received the sufficient quantity of PDUs (or SDUs) by determining that the base station 110 either did not receive an ACK signal from the UE 120 or stopped receiving ACK/NACK signals from the UE 120.

Additionally, or alternatively, the UE 120 may transmit, and the base station 110 may receive, an indication that the UE 120 has successfully decoded the frame. For example, the UE 120 may transmit uplink control information (UCI), a MAC control element (MAC-CE), and/or another signal indicating that the UE 120 has decoded the frame. Accordingly, the base station 110 may determine that the UE 120 has received the sufficient quantity of PDUs (or SDUs) based on the indication from the UE 120.

In some aspects, the UE 120 transmits the indication with a lower MCS than other transmissions to the base station 110. As a result, reliability of the indication is improved so that the base station 110 will receive the indication and refrain from continuing to transmit PDUs to the UE 120.

In any of the aspects described above, the sufficient quantity of PDUs may include one or more PDUs that account for one or more erroneous decodings associated with the feedback signals. For example, an ACK from the UE 120 may be dropped or erroneously encoded and/or decoded as a NACK. Similarly, a NACK from the UE 120 may be dropped or erroneously encoded and/or decoded as an ACK. Accordingly, the application that generated the frame may determine the sufficient quantity to account for erroneous decoding(s) or the access stratum of the base station 110 may increase a quantity output by the application to account for erroneous decoding(s). As an alternative, the access stratum of the base station 110 may determine the sufficient quantity to account for erroneous decoding(s).

Accordingly, as shown by reference number 320, the base station 110 may refrain from transmitting, to the UE 120, one or more additional PDUs associated with the frame. As a result, the base station 110 conserves power, processing resources, and network resources by not transmitting the additional PDU(s).

In some aspects, and as shown by reference number 325, the base station 110 may additionally transmit, and the UE 120 may receive, an instruction to enter a low-power mode. As used herein, "low-power mode" may refer to an idle mode or an inactive state (e.g., as defined in 3GPP specifications) or another mode in which the UE 120 conserves power by not monitoring for communications, or monitoring for fewer than usual communications, from the base station 110. For example, the base station 110 may transmit downlink control information (DCI), a MAC-CE, and/or another signal instructing the UE 120 to enter the low-power mode. As a result, the UE 120 conserves power and processing resources. The base station 110 may transmit the instruction based on determining that the UE 120 has received the sufficient quantity of PDUs (or SDUs). Additionally, in some aspects, the base station 110 may transmit the instruction based on determining that a buffer of downlink data, intended for the UE 120, at the base station 110 is empty. Accordingly, as shown by reference number 330, the UE 120 may enter the low-power mode rather than monitoring for additional scheduling information from the base station 110.

In some aspects, the base station 110 transmits the instruction with a lower MCS than the packet(s) from the base station 110. As a result, reliability of the instruction is improved so that the UE 120 will receive the instruction and conserve power and processing resources.

By using techniques as described in connection with FIG. 3, the base station 110 refrains from transmitting the one or more additional PDUs by determining that the UE 120 has received the sufficient quantity of PDUs to decode the frame associated with the additional PDU(s). As a result, the base station 110 conserves power, processing resources, and network resources by not transmitting the additional PDU(s). Additionally, the UE 120 may conserve power and processing resources by not monitoring for, and receiving, the additional PDU(s).

As indicated above, FIG. 3 is provided as an example. Other examples may differ from what is described with respect to FIG. 3.

Figure 4A:
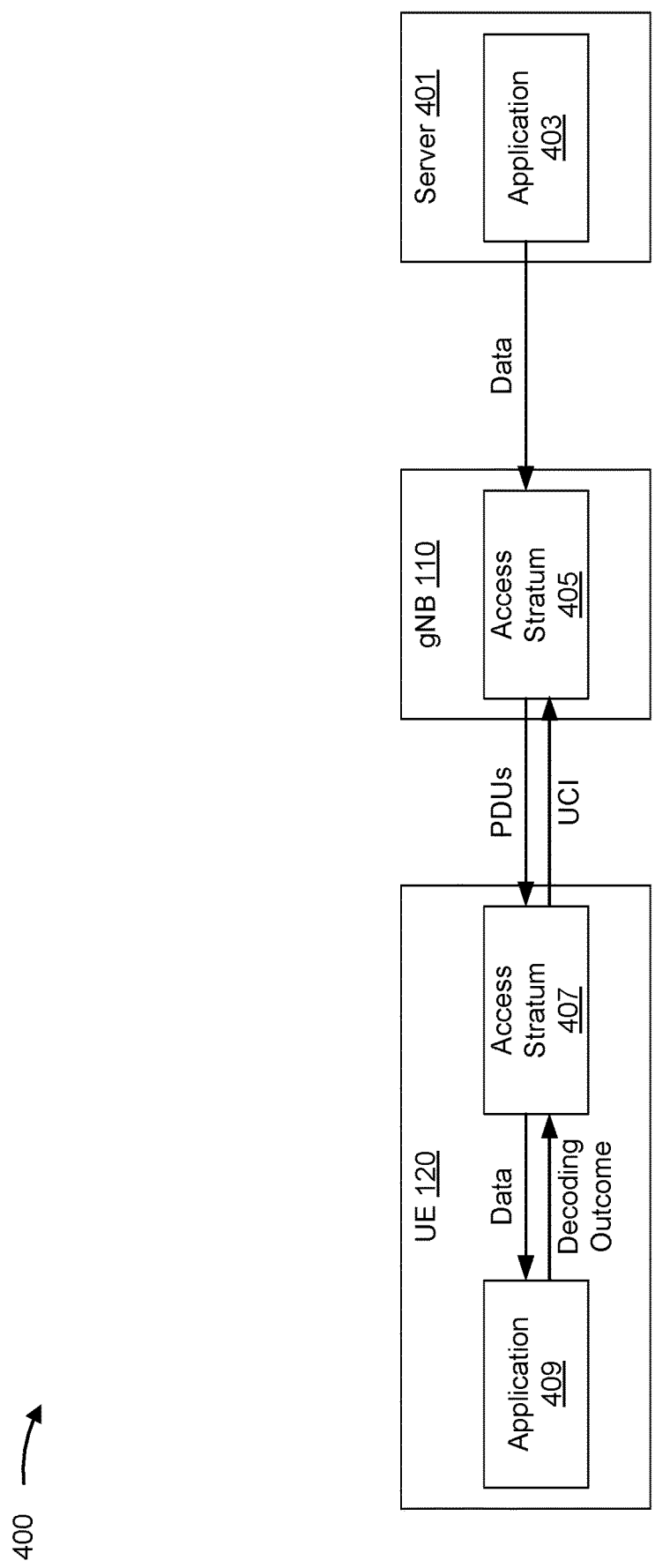
FIGS. 4A and 4B are diagrams illustrating examples associated with interfaces for downlink traffic management based on frame decoding, in accordance with the present disclosure.
Figure 4B:
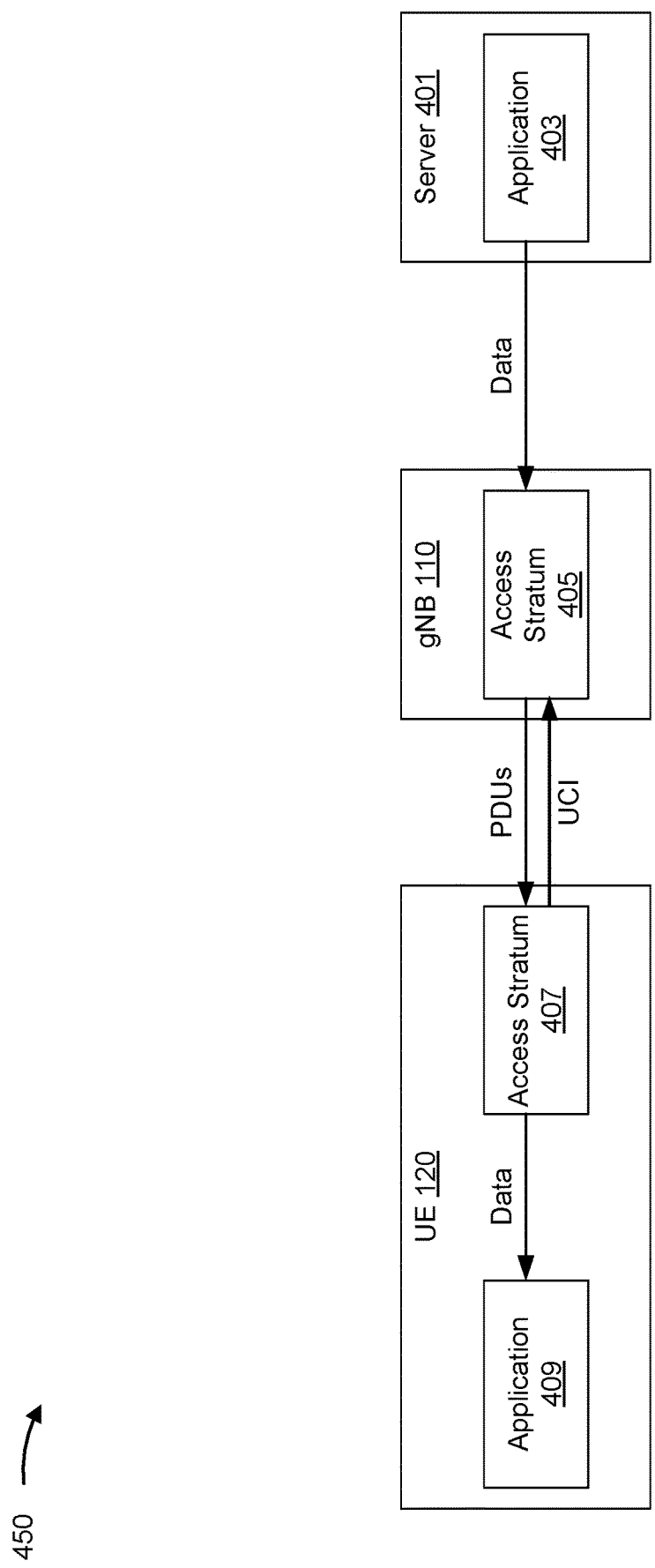

FIGS. 4A and 4B are diagrams illustrating examples 400 and 450, respectively, associated with interfaces for downlink traffic management based on frame decoding, in accordance with the present disclosure. As shown in FIG. 4A, example 400 includes an application 403 (e.g., software executing on a server 401) that generates data (e.g., a frame of data) intended for an application 409 executing on a UE 120. Accordingly, the application 403 may pass the frame to an access stratum 405 of a gNB 110 for transmission OTA to the UE 120. The access stratum 405 encodes the frame as one or more PDUs for transmission to the UE 120. In example 400, the application 403 applies FEC to the frame such that the gNB 110 may transmit the PDU(s) without retransmission.

Accordingly, an access stratum 407 of the UE 120 may receive the PDU(s) OTA and pass the same to the application 409 for decoding. Once the application 409 decodes the frame, the application 409 may indicate (e.g., via an application programming interface (API)) that the frame was decoded to the access stratum 407. Accordingly, as described in connection with FIG. 3, the access stratum 407 of the UE 120 may transmit an indication (e.g., UCI) that the frame was decoded to the access stratum 405 of the gNB 110. As a result, the gNB 110 may refrain from transmitting one or more additional PDUs, associated with the frame, to the UE 120 to conserve power, processing resources, and network resources.

As an alternative, in example 450, the access stratum 405 of the gNB 110 applies network coding to the PDUs such that the gNB 110 may transmit the PDU(s) without retransmission. Accordingly, an access stratum 407 of the UE 120 may receive the PDU(s) OTA and decode the PDU(s). Once the access stratum 407 decodes the frame, the access stratum 407 of the UE 120 may transmit an indication (e.g., UCI) that the frame was decoded to the access stratum 405 of the gNB 110, as described in connection with FIG. 3. As a result, the gNB 110 may refrain from transmitting one or more additional PDUs, associated with the frame, to the UE 120 to conserve power, processing resources, and network resources.

By using techniques as described in connection with FIGS. 4A and 4B, the access stratum 405 of the gNB 110 refrains from transmitting the one or more additional PDUs by determining the UE 120 has received the sufficient quantity of PDUs for the application 409 to decode the frame associated with the additional PDU(s). As a result, the gNB 110 conserves power, processing resources, and network resources by not transmitting the additional PDU(s). Additionally, the UE 120 may conserve power and processing resources by not monitoring for, and receiving, the additional PDU(s).

As indicated above, FIGS. 4A and 4B are provided as examples. Other examples may differ from what is described with respect to FIGS. 4A and 4B.

Figure 5A:
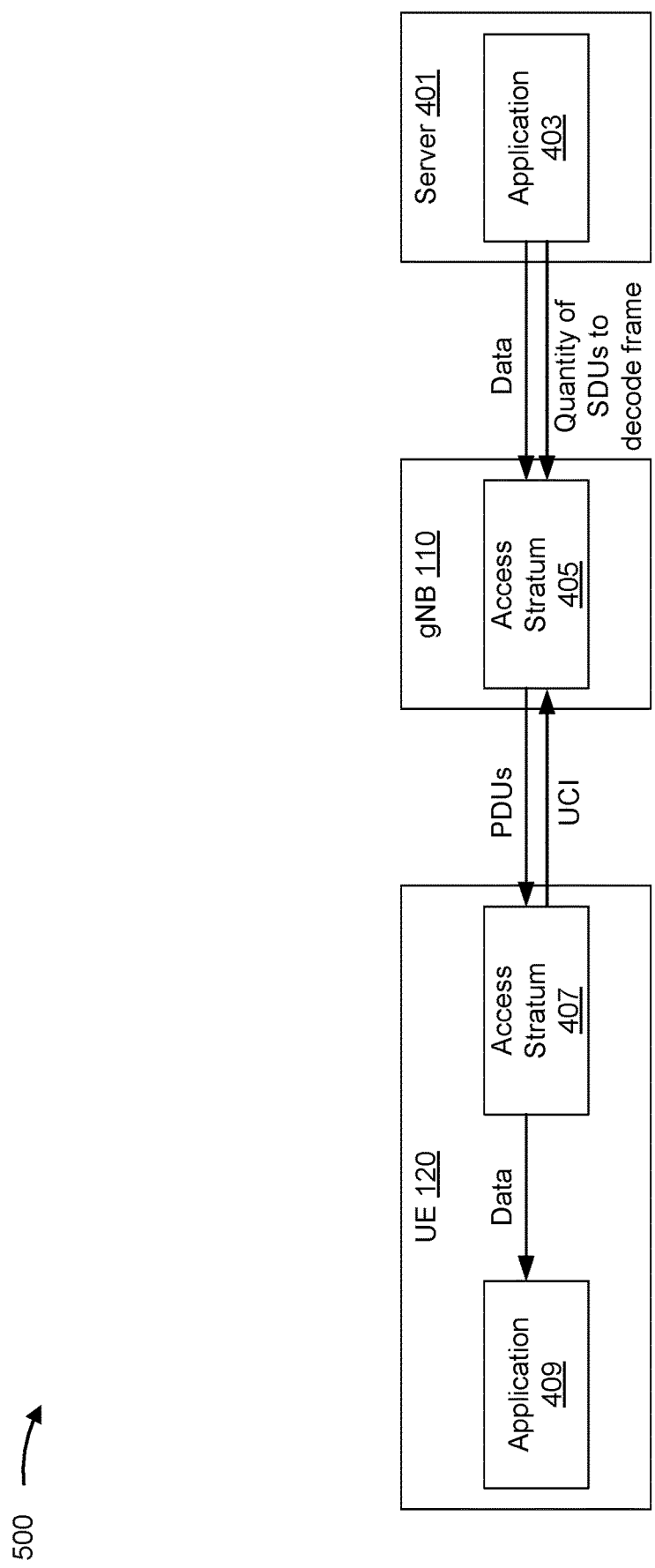
FIGS. 5A and 5B are diagrams illustrating examples associated with interfaces for downlink traffic management based on frame decoding, in accordance with the present disclosure.
Figure 5B:
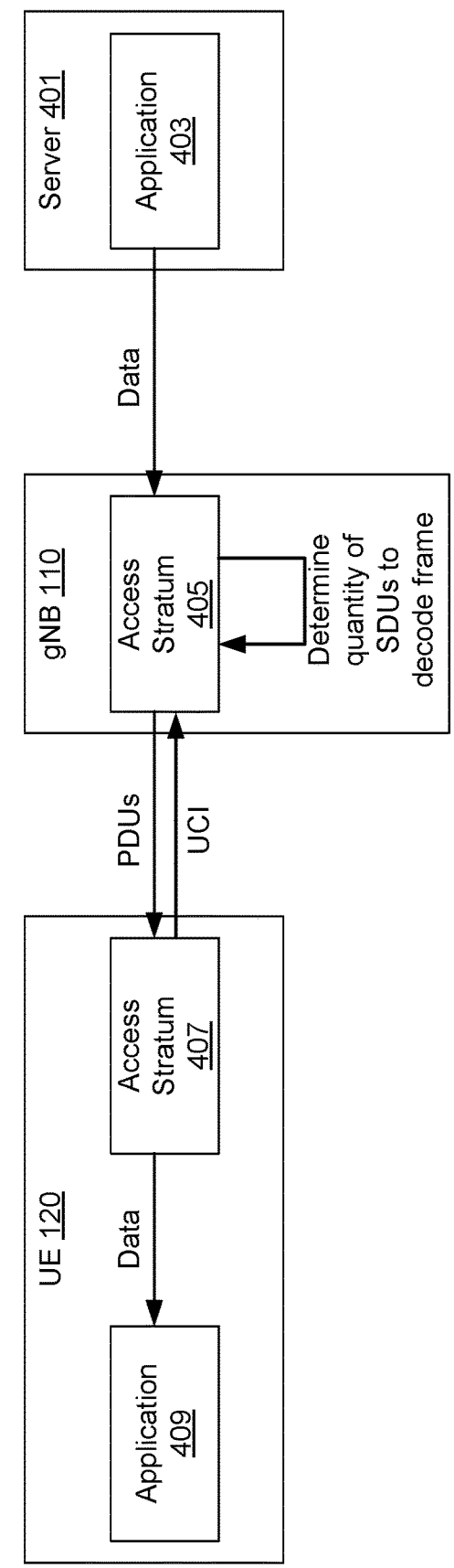

FIGS. 5A and 5B are diagrams illustrating examples 500 and 550, respectively, associated with interfaces for downlink traffic management based on frame decoding, in accordance with the present disclosure. As shown in FIG. 5A, example 500 includes an application 403 (e.g., software executing on a server 401) that generates data (e.g., a frame of data) intended for an application 409 executing on a UE 120. Accordingly, the application 403 may pass the frame to an access stratum 405 of a gNB 110 for transmission OTA to the UE 120. The access stratum 405 encodes the frame as one or more PDUs for transmission to the UE 120. In example 400, the application 403 applies FEC to the frame such that the gNB 110 may transmit the PDU(s) without retransmission. Accordingly, the application 403 may indicate (e.g., via an API or a gateway) a sufficient quantity of PDUs to decode the frame to the access stratum 405.

Accordingly, an access stratum 407 of the UE 120 may receive the PDU(s) OTA and pass the PDU(s) to the application 409 for decoding. Once the gNB 110 determines that the sufficient quantity of PDUs have been received by the UE 120, the gNB 110 may refrain from transmitting one or more additional PDUs, associated with the frame, as described in connection with FIG. 3. As a result, the gNB 110 conserves power, processing resources, and network resources.

As an alternative, in example 550, the access stratum 405 of the gNB 110 applies network coding to the PDUs such that the gNB 110 may transmit the PDU(s) without retransmission. Accordingly, the access stratum 405 may determine the sufficient quantity of PDUs to decode the frame. Once the gNB 110 determines that the sufficient quantity of PDUs have been received by the UE 120, the gNB 110 may refrain from transmitting one or more additional PDUs, associated with the frame, as described in connection with FIG. 3. As a result, the gNB 110 conserves power, processing resources, and network resources.

By using techniques as described in connection with FIGS. 5A and 5B, the access stratum 405 of the gNB 110 refrains from transmitting the one or more additional PDUs by determining the UE 120 has received the sufficient quantity of PDUs for the access stratum 407 of the UE 120 to decode the frame associated with the additional PDU(s). As a result, the gNB 110 conserves power, processing resources, and network resources by not transmitting the additional PDU(s). Additionally, the UE 120 may conserve power and processing resources by not monitoring for, and receiving, the additional PDU(s).

As indicated above, FIGS. 5A and 5B are provided as examples. Other examples may differ from what is described with respect to FIGS. 5A and 5B.

Figure 6:
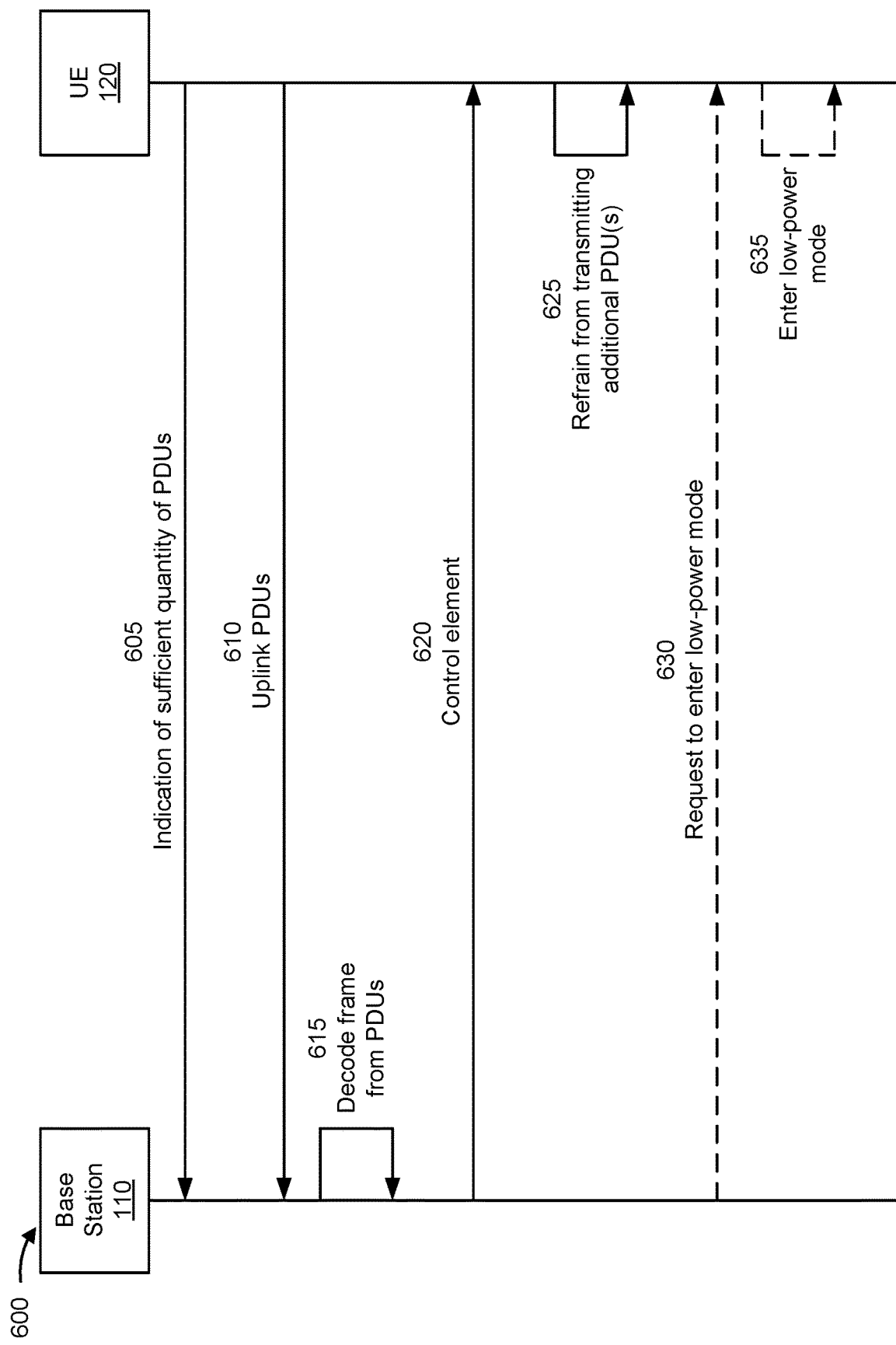
FIG. 6 is a diagram illustrating an example associated with uplink traffic management based on frame decoding, in accordance with the present disclosure.

FIG. 6 is a diagram illustrating an example 600 associated with uplink traffic management based on frame decoding, in accordance with the present disclosure. As shown in FIG. 6, a base station 110 and a UE 120 may communicate with one another.

As shown by reference number 605, the UE 120 may transmit, and the base station 110 may receive, an indication of a sufficient quantity of PDUs (or SDUs) to decode a frame of data (e.g., as described in connection with reference number 610). For example, the UE 120 may transmit UCI, a MAC-CE, and/or another signal indicating the sufficient quantity. The sufficient quantity may be indicated by the application that generated the frame (e.g., as described in connection with FIG. 7A) and/or determined at an access stratum of the UE 120 (e.g., as described in connection with FIG. 7B). Accordingly, the base station 110 may determine when the base station 110 has received the sufficient quantity of PDUs (or SDUs) based on the indication from the UE 120.

In some aspects, the UE 120 transmits the indication with a lower MCS than other transmissions to the base station 110. As a result, reliability of the indication is improved so that the base station 110 will receive the indication and can determine when the base station 110 has received the sufficient quantity. Additionally, or alternatively, the UE 120 may transmit the indication more than once (e.g., with a first quantity of a plurality of packets, as described in connection with reference number 610) in order to increase reliability of the indication. As a result, the base station 110 will receive the indication and can determine when the base station 110 has received the sufficient quantity.

As shown by reference number 610, the UE 120 may transmit, and the base station 110 may receive, one or more packets (e.g., one or more PDUs/SDUs) associated with the frame of data. For example, the UE 120 may receive the frame of data from an application (e.g., as described in connection with FIGS. 7A and/or 7B) for transmission OTA to the base station 110. Accordingly, the UE 120 may encode the frame as one or more packets.

The UE 120 may apply network coding or FEC such that the one or more packets are one or more encoded packets from which the base station 110 may decode the frame of data. Accordingly, as shown by reference number 615, the base station 110 may decode the data from the PDU(s)/SDU(s) received from the UE 120. The decoding may occur at an application (e.g., as described in connection with FIG. 7A) or at an access stratum of the base station 110 (e.g., as described in connection with FIG. 7B).

As shown by reference number 620, the base station 110 may transmit, and the UE 120 may receive, an indication that the base station 110 has received the sufficient quantity of PDUs (or SDUs)) to decode the frame. In some aspects, the indication may include DCI, a MAC-CE, an RLC control PDU, a PDCP control PDU, and/or another signal such that the UE 120 may determine that the base station 110 has a received a sufficient quantity of PDUs (or SDUs) to decode the frame.

In some aspects, the base station 110 transmits the indication with a lower MCS than other transmissions to the UE 120. As a result, reliability of the indication is improved so that the UE 120 will receive the indication and can determine when the base station 110 has received the sufficient quantity.

Accordingly, as shown by reference number 625, the UE 120 may refrain from transmitting, to the base station 110, one or more additional PDUs associated with the frame. As a result, the UE 120 conserves power, processing resources, and network resources by not transmitting the additional PDU(s).

In some aspects, and as shown by reference number 630, the base station 110 may additionally transmit, and the UE 120 may receive, an instruction to enter a low-power mode. For example, the base station 110 may transmit DCI, a MAC-CE, and/or another signal instructing the UE 120 to enter the low-power mode. As a result, and as shown by reference number 635, the UE 120 enters the low-power mode to conserve power and processing resources. The base station 110 may transmit the instruction based on determining that the base station 110 has received the sufficient quantity of PDUs (or SDUs). Additionally, in some aspects, the base station 110 may transmit the instruction based on determining that a buffer of uplink data, intended for the base station 110, at the UE 120 is empty. For example, the base station 110 may use one or more buffer status reports (BSRs), received from the UE 120, to determine that the buffer of uplink data is empty.

By using techniques as described in connection with FIG. 6, the UE 120 refrains from transmitting the one or more additional PDUs by determining that the base station 110 has received the sufficient quantity of PDUs to decode the frame associated with the additional PDU(s). As a result, the UE 120 conserves power, processing resources, and network resources by not transmitting the additional PDU(s). Additionally, the base station 110 may conserve power and processing resources by not monitoring for, and receiving, the additional PDU(s).

As indicated above, FIG. 6 is provided as an example. Other examples may differ from what is described with respect to FIG. 6.

Figure 7A:
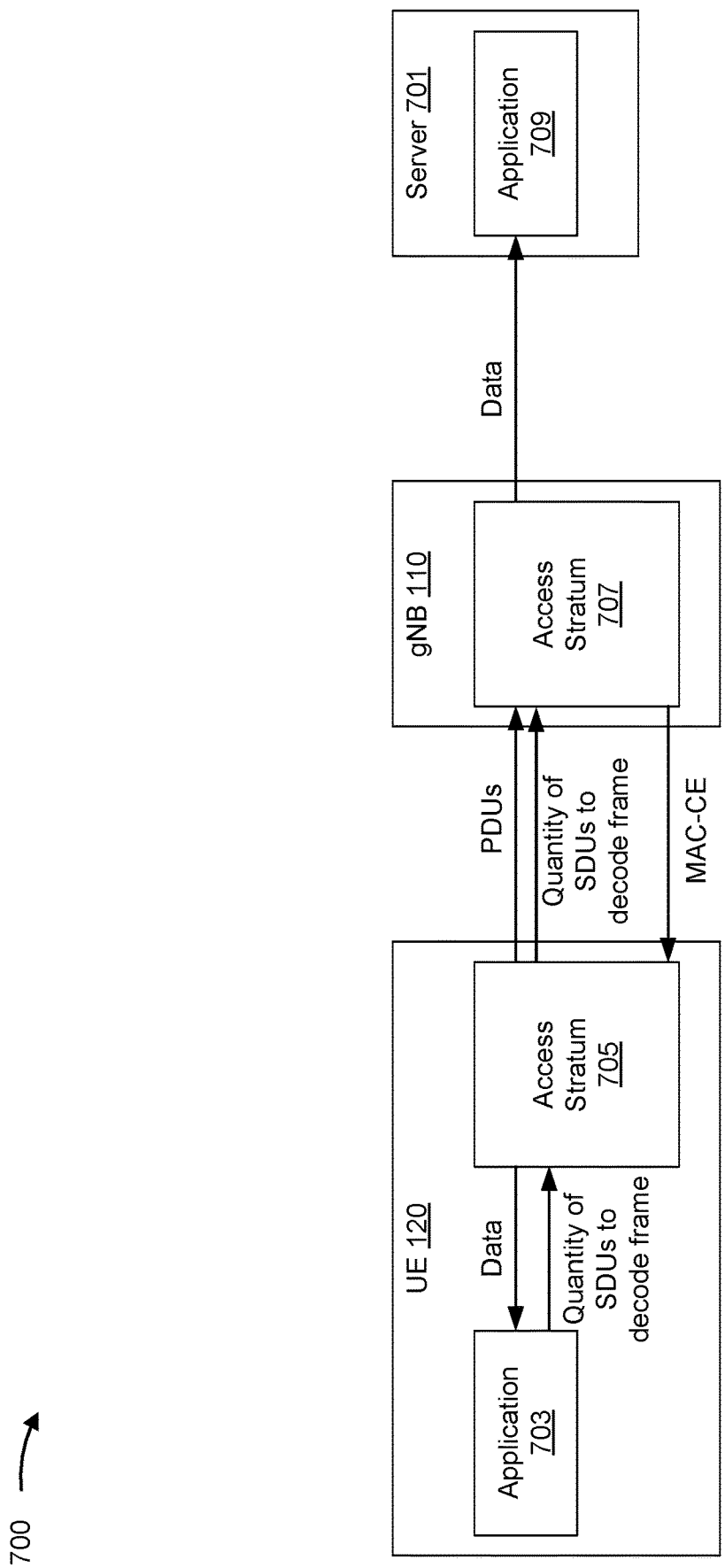
FIGS. 7A and 7B are diagrams illustrating examples associated with interfaces for uplink traffic management based on frame decoding, in accordance with the present disclosure.
Figure 7B:
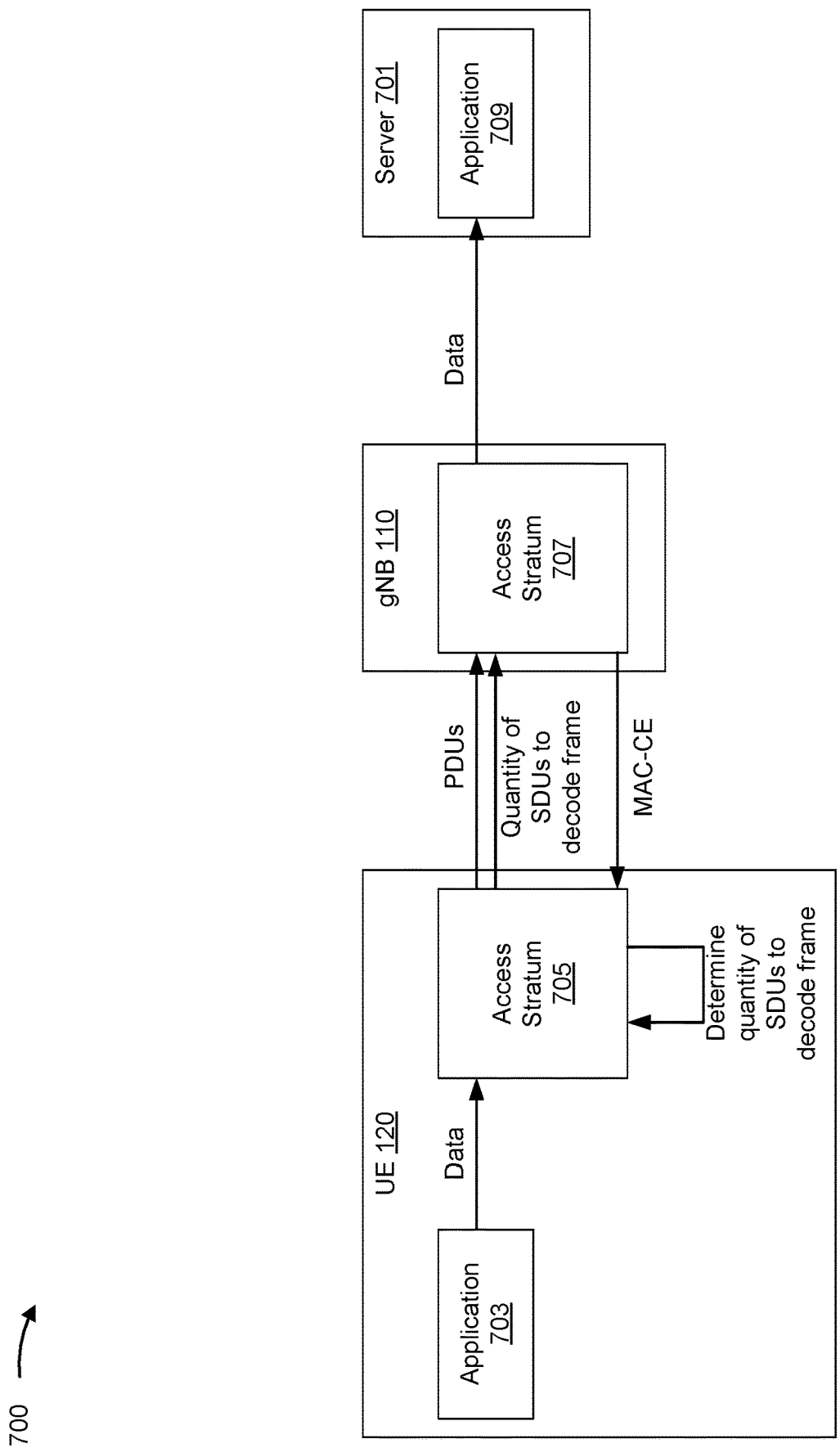

FIGS. 7A and 7B are diagrams illustrating examples 700 and 750, respectively, associated with interfaces for uplink traffic management based on frame decoding, in accordance with the present disclosure. As shown in FIG. 7A, example 700 includes an application 703 on a UE 120 that generates data (e.g., a frame of data) intended for an application 709 (e.g., software executing on a server 701). Accordingly, the application 703 may pass the frame to an access stratum 705 of a UE 120 for transmission OTA to a gNB 110. The access stratum 705 encodes the frame as one or more PDUs for transmission to the gNB 110. In example 500, the application 703 applies FEC to the frame such that the UE 120 may transmit the PDU(s) without retransmission. Accordingly, the application 703 may indicate (e.g., via an API or a gateway) a sufficient quantity of SDUs to decode the frame to the access stratum 705.

Accordingly, an access stratum 707 of the gNB 110 may receive the PDU(s) OTA and pass the PDU(s) to the application 709 for decoding. The access stratum 705 of the UE 120 may additionally indicate the sufficient quantity to the gNB 110. Once the gNB 110 determines that the sufficient quantity of SDUs have been received by the gNB 110, the gNB 110 may transmit an indication (e.g., a MAC-CE, an RLC control PDU, and/or a PDCP control PDU) that the frame can be decoded to the UE 120, as described in connection with FIG. 6. As a result, the UE 120 may refrain from transmitting one or more additional PDUs, associated with the frame, to the gNB 110, to conserve power, processing resources, and network resources.

As an alternative, in example 750, the access stratum 705 of the UE 120 applies network coding to the PDUs such that the UE 120 may transmit the PDU(s) without retransmission. Accordingly, the access stratum 705 may determine the sufficient quantity of PDUs to decode the frame. The access stratum 705 of the UE 120 may additionally indicate the sufficient quantity to the gNB 110. Once the gNB 110 determines that the sufficient quantity of SDUs has been received by the gNB 110, the gNB 110 may transmit an indication (e.g., a MAC-CE, an RLC control PDU, and/or a PDCP control PDU) that the frame can be decoded to the UE 120, as described in connection with FIG. 6. As a result, the UE 120 may refrain from transmitting one or more additional PDUs, associated with the frame, to the gNB 110 to conserve power, processing resources, and network resources.

By using techniques as described in connection with FIGS. 7A and 7B, the access stratum 705 of the UE 120 refrains from transmitting the one or more additional PDUs by determining that the gNB 110 has received the sufficient quantity of PDUs to decode the frame associated with the additional PDU(s). As a result, the UE 120 conserves power, processing resources, and network resources by not transmitting the additional PDU(s). Additionally, the gNB 110 may conserve power and processing resources by not monitoring for, and receiving, the additional PDU(s).

As indicated above, FIGS. 7A and 7B are provided as examples. Other examples may differ from what is described with respect to FIGS. 7A and 7B.

When network coding or FEC is used, hybrid automatic repeat request (HARD) feedback may waste network resources, power, and processing resources because retransmissions are disabled in favor of the network coding or the FEC. Accordingly, some techniques and apparatuses described herein enable a base station (e.g., base station 110) to indicate that a UE (e.g., UE 120) should refrain from transmitting one or more feedback signals. As a result, the UE 120 conserves power, processing resources, and network resources by not transmitting the feedback signal(s). In some aspects, the UE 120 may enter a low-power state sooner than if the UE 120 had transmitted the feedback signal(s), which further conserves power and processing resources. Additionally, the base station 110 may conserve power and processing resources by not monitoring for, and receiving, the feedback signal(s).

Figure 8:
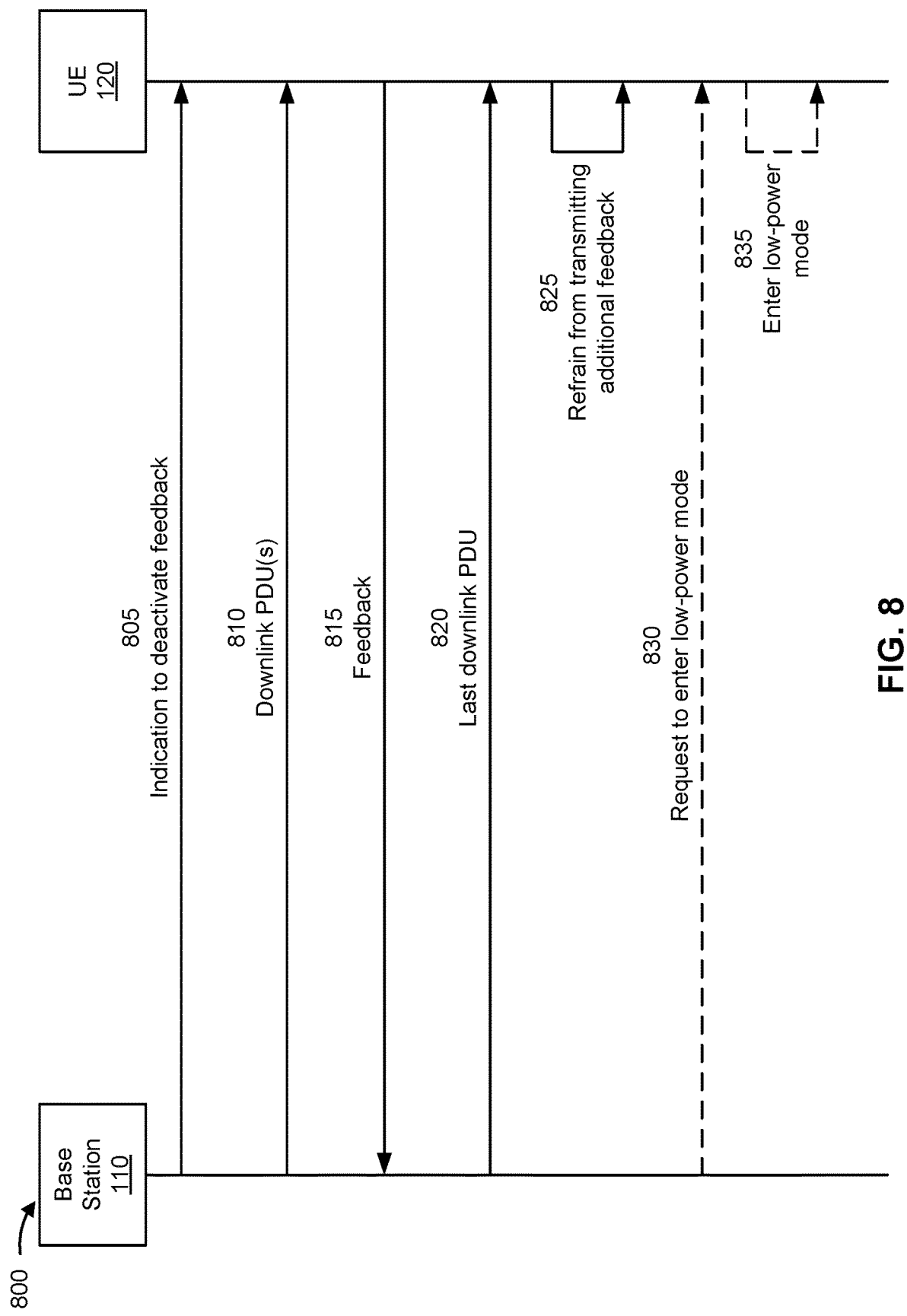
FIG. 8 is a diagram illustrating an example associated with feedback management based on frame decoding, in accordance with the present disclosure.

FIG. 8 is a diagram illustrating an example 800 associated with feedback management based on frame decoding, in accordance with the present disclosure. As shown in FIG. 8, a base station 110 and a UE 120 may communicate with one another.

As shown by reference number 805, the base station 110 may transmit, and the UE 120 may receive, an indication to disable some feedback to the network. The indication may include an RRC message and/or DCI.

The indication may instruct the UE 120 to omit feedback unconditionally. Accordingly, the UE 120 may refrain from transmitting any feedback signals to the base station 110. In some aspects, the indication may further include an ackNack-Mask parameter and/or another parameter such that the UE 120 refrains from transmitting any feedback signals to the base station 110 outside an active discontinuous reception (DRX) time associated with the UE 120.

As an alternative, the indication may instruct the UE 120 to omit feedback conditionally. Accordingly, the UE 120 may refrain from transmitting feedback signals, associated with a frame of data, to the base station 110 after the UE 120 successfully decodes the frame. Additionally, or alternatively, the base station 110 may transmit, and the UE 120 may receive, the indication after the UE 120 indicates that the UE 120 successfully decoded the frame. Accordingly, the UE 120 may omit feedback dynamically when instructed by the base station 110.

As shown by reference number 810, the base station 110 may transmit, and the UE 120 may receive, one or more packets (e.g., one or more PDUs/SDUs) associated with a frame of data. For example, the base station 110 may receive the frame of data from an application (e.g., as described in connection with FIGS. 4A, 4B, 5A, and/or 5B) for transmission OTA to the UE 120. Accordingly, the base station 110 may encode the frame as one or more packets. The base station 110 may apply network coding or FEC such that the one or more packets are one or more encoded packets from which the UE 120 may decode the frame of data. The UE 120 may decode the data from the PDU(s)/SDU(s) at an application (e.g., as described in connection with FIGS. 4A and/or 5A) or at an access stratum of the UE 120 (e.g., as described in connection with FIGS. 4B and/or 5B).

In some aspects, and as shown by reference number 815, the UE 120 may transmit, and the base station 110 may receive, one or more feedback signals. In some aspects, the feedback may include ACK and/or NACK signals. For example, the indication described in connection with reference number 805 may have included a configuration message associated with conditional deactivation of feedback. Accordingly, the UE 120 may still transmit some feedback. As an alternative, the indication described in connection with reference number 805 may have included a configuration message associated with unconditional deactivation of feedback. Accordingly, the UE 120 may omit processes described in connection with reference number 815.

After the base station 110 transmits a final PDU associated with the frame, as shown by reference number 830, the UE 120 may refrain from transmitting one or more feedback signals to the base station 110, as shown by reference number 825. The UE 120 may refrain based on the indication from the base station 110. Additionally, in some aspects, the UE 120 may refrain based on determining that a downlink period associated with the frame has ended (e.g., by the base station 110 transmitting the final PDU). Accordingly, the base station 110 may refrain from monitoring an uplink control channel (e.g., a physical uplink control channel (PUCCH)) with the UE 120 in order to conserve power and processing resources.

In some aspects, and as shown by reference number 830, the base station 110 may transmit, and the UE 120 may receive, an instruction to enter a low-power mode. For example, the base station 110 may transmit DCI (e.g., including a new "Disable HARQ Feedback & Go To Sleep" parameter, as may be defined in 3GPP specifications and/or another standard, and/or including a "PDSCH-to-HARQ feedback timing indicator" that is associated with an RRC parameter like dl-DataToUL-ACK set to a new value like −1, as defined in 3GPP specifications and/or another standard), a MAC-CE, and/or another signal instructing the UE 120 to enter the low-power mode. As a result, the UE 120 conserves power and processing resources. The base station 110 may transmit the instruction based on determining that the UE 120 has received a sufficient quantity of PDUs (or SDUs), as described in connection with FIG. 3. Additionally, in some aspects, the base station 110 may transmit the instruction based on determining that a buffer of downlink data, intended for the UE 120, at the base station 110 is empty. Accordingly, as shown by reference number 830, the UE 120 may enter the low-power mode rather than monitoring for additional scheduling information from the base station 110.

As shown by reference number 835, the UE 120 may enter the low-power state. For example, the UE 120 may enter the low-power mode based at least in part on the instruction from the base station 110. Additionally, or alternatively, the base station 110 may set (e.g., via RRC signaling) a retransmission timer to zero (e.g., by setting a drx-RetransmissionTimerDL, as defined in 3GPP specifications and/or another standard, to a value of zero) and an inactivity timer to a low (e.g., less than a few microseconds (ms)) value (e.g., by setting a DRX_InactivityTimer, as defined in 3GPP specifications and/or another standard, to a value of zero).

By using techniques as described in connection with FIG. 8, the base station 110 indicates that the UE 120 should refrain from transmitting one or more feedback signals. As a result, the UE 120 conserves power, processing resources, and network resources by not transmitting the feedback signal(s). In some aspects, the UE 120 may enter a low-power state sooner than if the UE 120 had transmitted the feedback signal(s), which further conserves power and processing resources. Additionally, the base station 110 may conserve power and processing resources by not monitoring for, and receiving, the feedback signal(s).

As indicated above, FIG. 8 is provided as an example. Other examples may differ from what is described with respect to FIG. 8.

Figure 9:
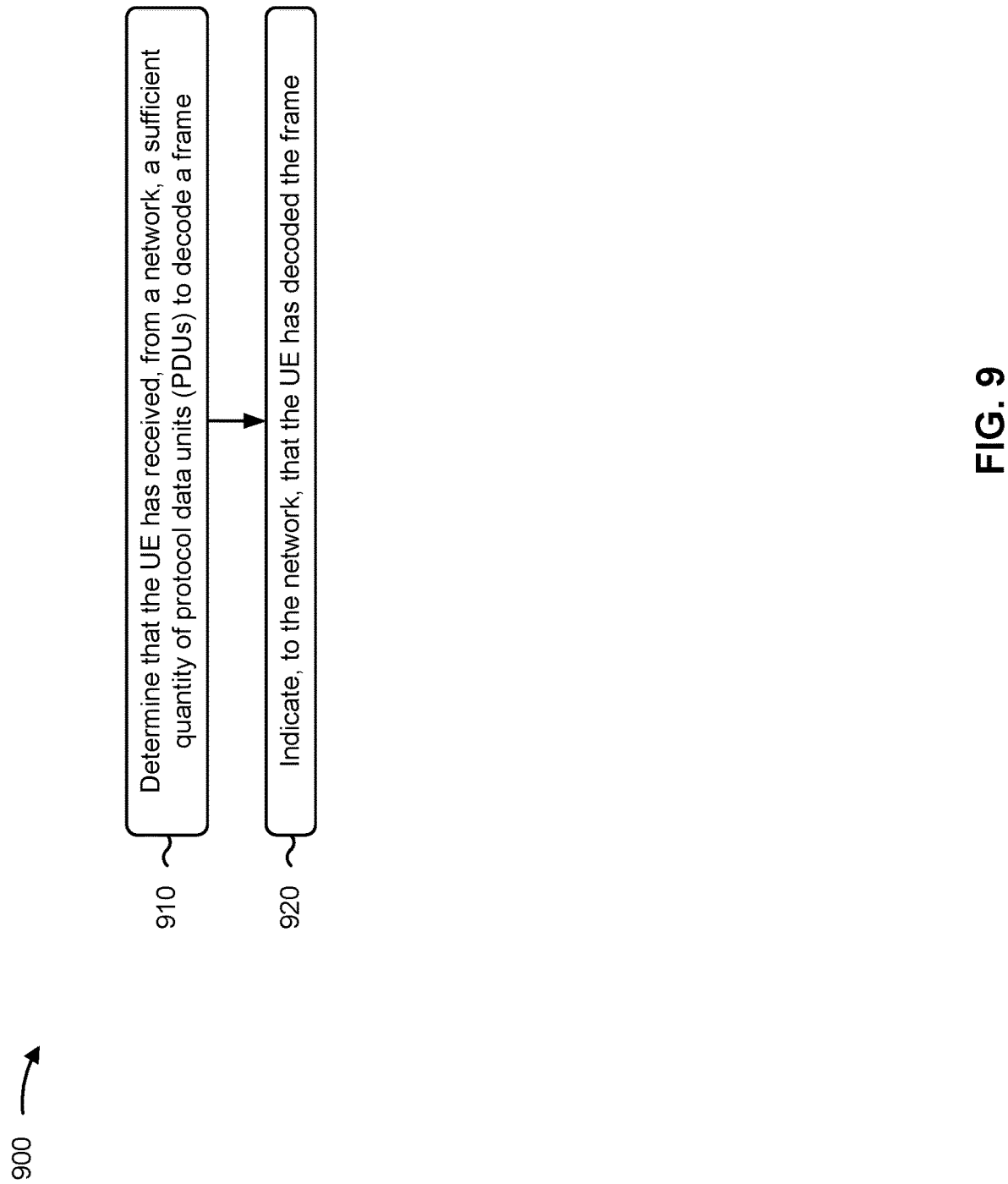
FIGS. 9 and 10 are diagrams illustrating example processes associated with downlink traffic management based on frame decoding, in accordance with the present disclosure.

FIG. 9 is a diagram illustrating an example process 900 performed, for example, by a UE, in accordance with the present disclosure. Example process 900 is an example where the UE (e.g., UE 120 and/or apparatus 1500 of FIG. 15) performs operations associated with traffic management based on frame decoding.

As shown in FIG. 9, in some aspects, process 900 may include determining that the UE has received, from a network (e.g., including base station 110 and/or apparatus 1600 of FIG. 16), a sufficient quantity of PDUs to decode a frame (block 910). For example, the UE (e.g., using communication manager 140 and/or determination component 1508, depicted in FIG. 15) may determine that the UE has received, from a network, a sufficient quantity of PDUs to decode a frame, as described herein.

As further shown in FIG. 9, in some aspects, process 900 may include indicating, to the network, that the UE has decoded the frame (block 920). For example, the UE (e.g., using communication manager 140 and/or transmission component 1504, depicted in FIG. 15) may indicate, to the network, that the UE has decoded the frame, as described herein.

Process 900 may include additional aspects, such as any single aspect or any combination of aspects described below and/or in connection with one or more other processes described elsewhere herein.

Figure 15:
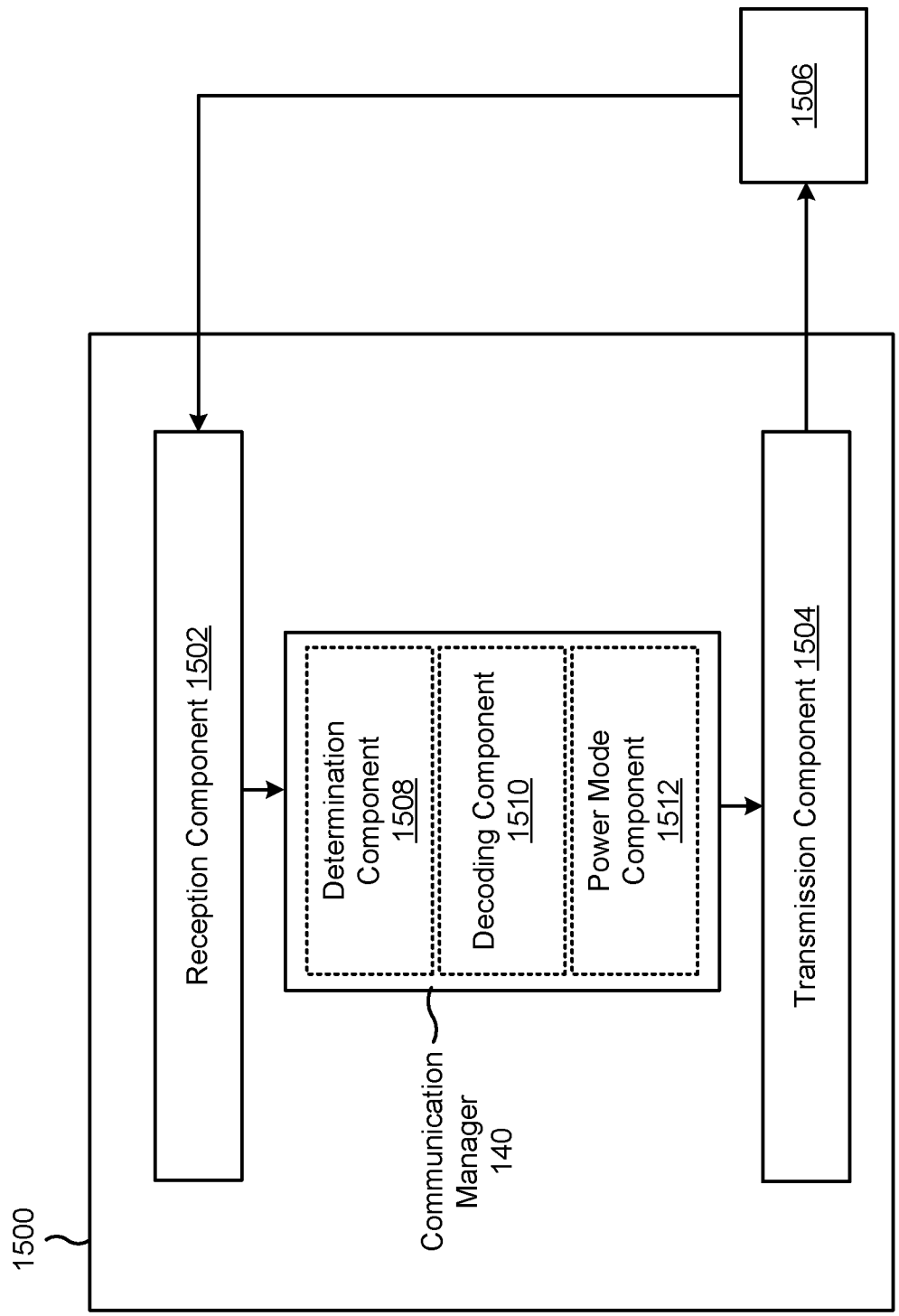
FIGS. 15 and 16 are diagrams of example apparatuses for wireless communication, in accordance with the present disclosure.

In a first aspect, determining that the UE has received the sufficient quantity of PDUs includes receiving (e.g., using communication manager 140 and/or reception component 1502, depicted in FIG. 15), from an application and at an access stratum of the UE, an indication that the frame has been decoded.

In a second aspect, alone or in combination with the first aspect, determining that the UE has received the sufficient quantity of PDUs includes decoding (e.g., using communication manager 140 and/or decoding component 1510, depicted in FIG. 15), at an access stratum of the UE, the frame.

In a third aspect, alone or in combination with one or more of the first and second aspects, process 900 further includes receiving (e.g., using communication manager 140 and/or reception component 1502), from the network, a configuration message associated with conditional deactivation of feedback, such that indicating that the UE has decoded the frame includes refraining from transmitting an acknowledgement signal to the network.

In a fourth aspect, alone or in combination with one or more of the first through third aspects, indicating that the UE has decoded the frame includes transmitting an indication to the network.

In a fifth aspect, alone or in combination with one or more of the first through fourth aspects, process 900 further includes refraining from monitoring (e.g., using communication manager 140 and/or reception component 1502) for additional PDUs from the network based at least in part on indicating to the network that the UE has decoded the frame.

In a sixth aspect, alone or in combination with one or more of the first through fifth aspects, process 900 further includes receiving (e.g., using communication manager 140 and/or reception component 1502), from the network, an instruction to enter a low-power mode based at least in part on indicating to the network that the UE has decoded the frame, and entering the low-power mode (e.g., using communication manager 140 and/or power mode component 1512) based at least in part on the instruction.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
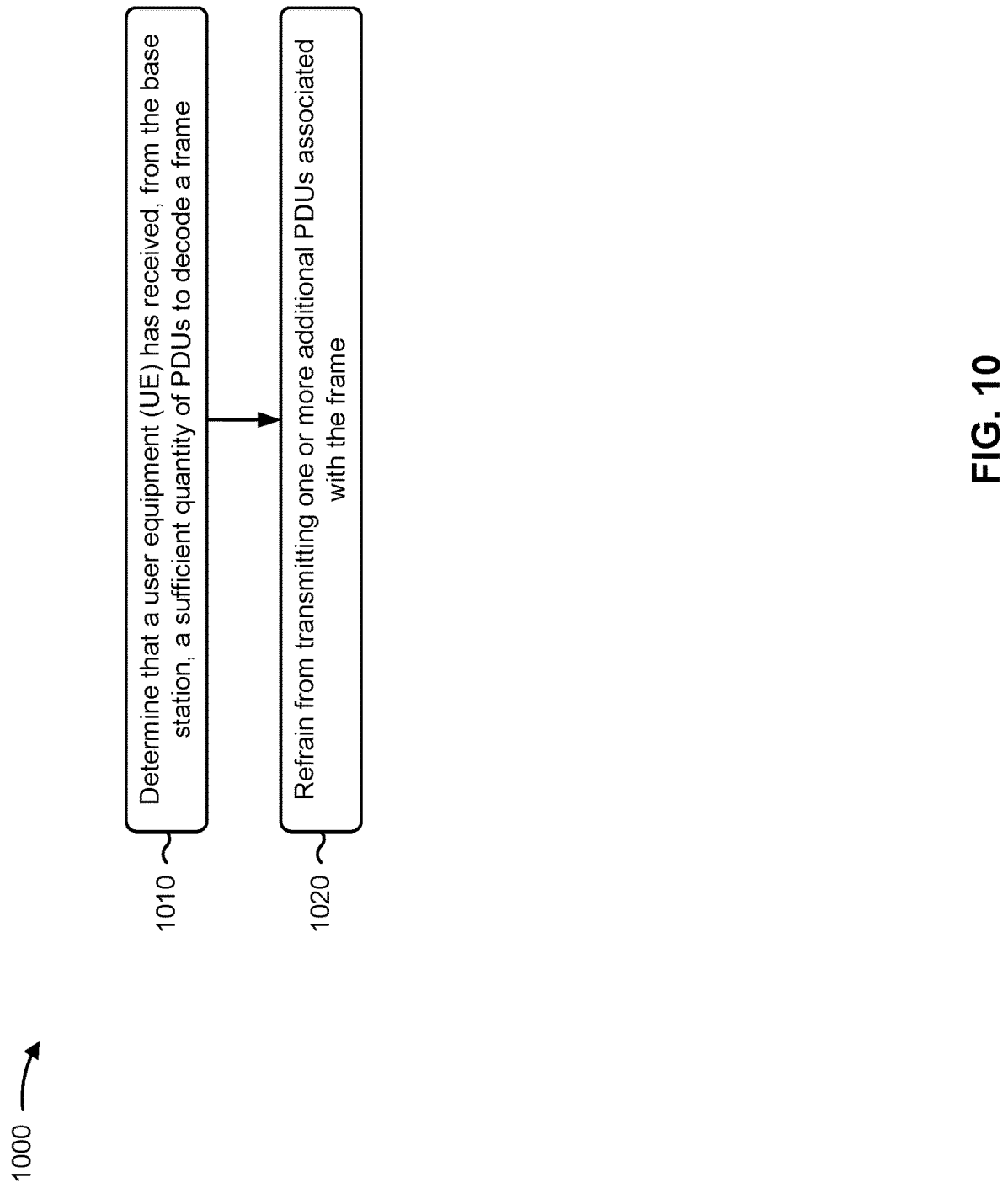

FIG. 10 is a diagram illustrating an example process 1000 performed, for example, by a base station, in accordance with the present disclosure. Example process 1000 is an example where the base station (e.g., base station 110 and/or apparatus 1600 of FIG. 16) performs operations associated with traffic management based on frame decoding.

As shown in FIG. 10, in some aspects, process 1000 may include determining that a UE (e.g., UE 120 and/or apparatus 1500 of FIG. 15) has received, from the base station, a sufficient quantity of PDUs to decode a frame (block 1010). For example, the base station (e.g., using communication manager 150 and/or determination component 1608, depicted in FIG. 16) may determine that a UE has received, from the base station, a sufficient quantity of PDUs to decode a frame, as described herein.

As further shown in FIG. 10, in some aspects, process 1000 may include refraining from transmitting one or more additional PDUs associated with the frame (block 1020). For example, the base station (e.g., using communication manager 150 and/or transmission component 1604, depicted in FIG. 16) may refrain from transmitting one or more additional PDUs associated with the frame, as described herein.

Process 1000 may include additional aspects, such as any single aspect or any combination of aspects described below and/or in connection with one or more other processes described elsewhere herein.

In a first aspect, process 1000 further includes transmitting (e.g., using communication manager 150 and/or transmission component 1604), to the UE, a configuration message associated with conditional deactivation of feedback, such that determining that the UE has received the sufficient quantity of PDUs includes determining that the base station did not receive an acknowledgement signal from the UE.

Figure 16:
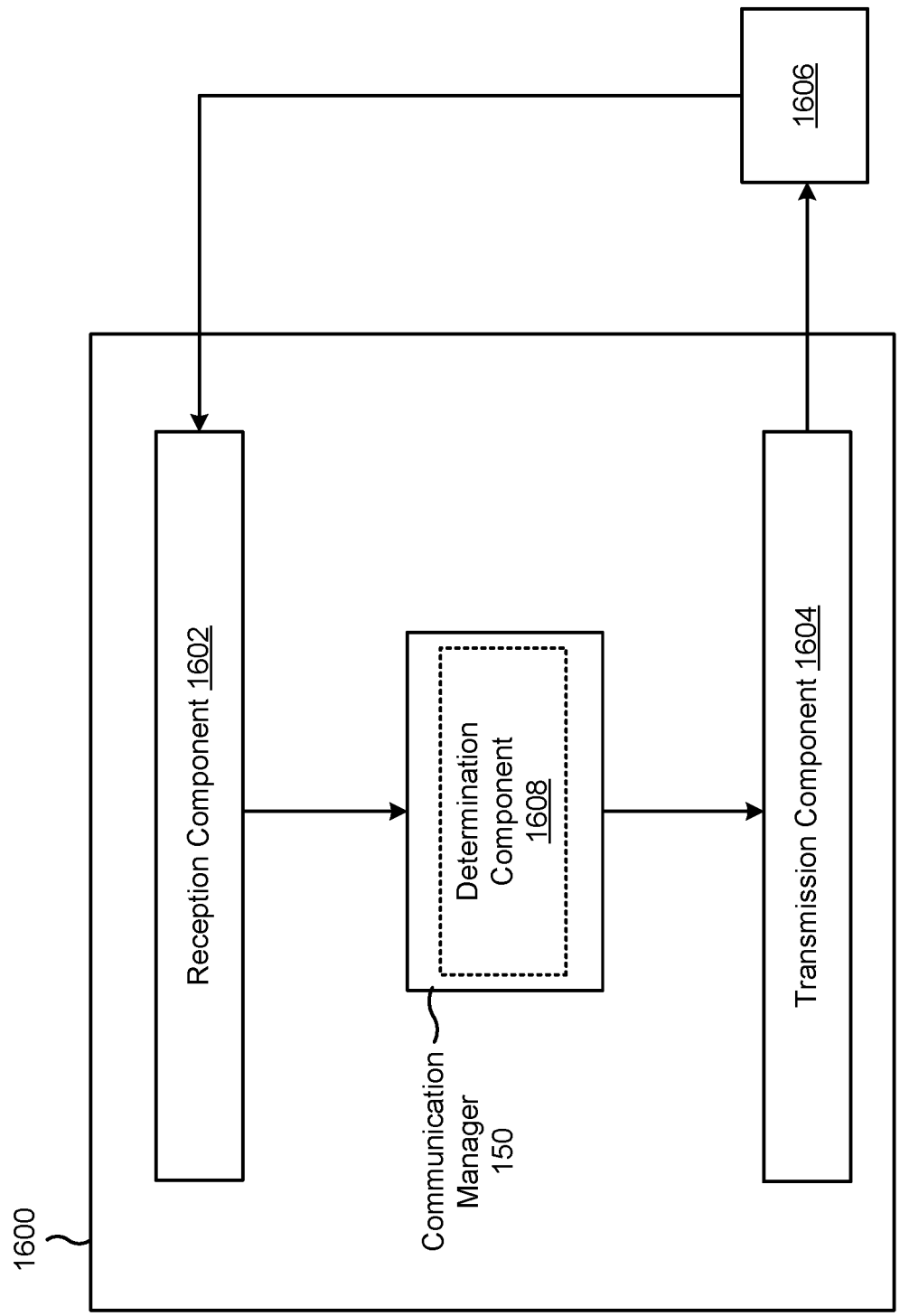

In a second aspect, alone or in combination with the first aspect, determining that the UE has received the sufficient quantity of PDUs includes receiving (e.g., using communication manager 150 and/or reception component 1602, depicted in FIG. 16) an indication from the UE.

In a third aspect, alone or in combination with one or more of the first and second aspects, process 1000 further includes receiving (e.g., using communication manager 150 and/or reception component 1602), from an application providing the frame, an indication of the sufficient quantity of PDUs to decode the frame.

In a fourth aspect, alone or in combination with one or more of the first through third aspects, process 1000 further includes determining (e.g., using communication manager 150 and/or determination component 1608), at an access stratum of the base station, the sufficient quantity of PDUs to decode the frame.

In a fifth aspect, alone or in combination with one or more of the first through fourth aspects, process 1000 further includes receiving (e.g., using communication manager 150 and/or reception component 1602), from the UE, feedback signals associated with PDUs, such that determining that the UE has received the sufficient quantity of PDUs includes comparing a quantity of the feedback signals to the sufficient quantity of PDUs to decode the frame.

In a sixth aspect, alone or in combination with one or more of the first through fifth aspects, the sufficient quantity of PDUs includes one or more PDUs that account for one or more erroneous decodings associated with the feedback signals.

In a seventh aspect, alone or in combination with one or more of the first through sixth aspects, process 1000 further includes transmitting (e.g., using communication manager 150 and/or transmission component 1604), to the UE, an instruction to enter a low-power mode based at least in part on determining that the UE has received the sufficient quantity of PDUs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
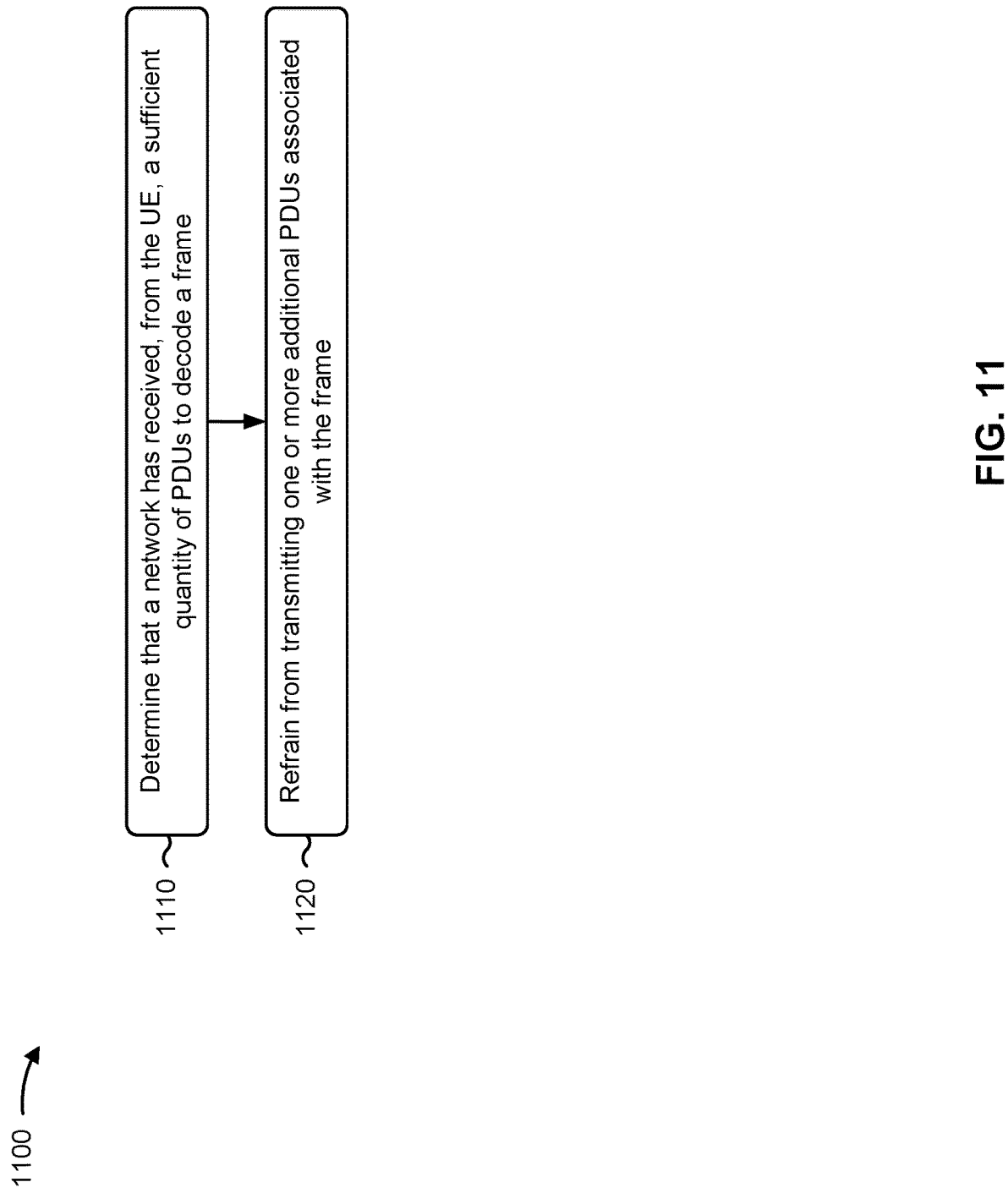
FIGS. 11 and 12 are diagrams illustrating example processes associated with uplink traffic management based on frame decoding, in accordance with the present disclosure.

FIG. 11 is a diagram illustrating an example process 1100 performed, for example, by a UE, in accordance with the present disclosure. Example process 1100 is an example where the UE (e.g., UE 120 and/or apparatus 1500 of FIG. 15) performs operations associated with traffic management based on frame decoding.

As shown in FIG. 11, in some aspects, process 1100 may include determining that a network (e.g., including base station 110 and/or apparatus 1600 of FIG. 16) has received, from the UE, a sufficient quantity of PDUs to decode a frame (block 1110). For example, the UE (e.g., using communication manager 140 and/or determination component 1508, depicted in FIG. 15) may determine that a network has received, from the UE, a sufficient quantity of PDUs to decode a frame, as described herein.

As further shown in FIG. 11, in some aspects, process 1100 may include refraining from transmitting one or more additional PDUs associated with the frame (block 1120). For example, the UE (e.g., using communication manager 140 and/or transmission component 1504, depicted in FIG. 15) may refrain from transmitting one or more additional PDUs associated with the frame, as described herein.

Process 1100 may include additional aspects, such as any single aspect or any combination of aspects described below and/or in connection with one or more other processes described elsewhere herein.

In a first aspect, process 1100 further includes receiving (e.g., using communication manager 140 and/or reception component 1502, depicted in FIG. 15), from an application providing the frame, an indication of the sufficient quantity of PDUs to decode the frame.

In a second aspect, alone or in combination with the first aspect, process 1100 further includes determining (e.g., using communication manager 140 and/or determination component 1508), at an access stratum of the UE, the sufficient quantity of PDUs to decode the frame.

In a third aspect, alone or in combination with one or more of the first and second aspects, process 1100 further includes transmitting (e.g., using communication manager 140 and/or transmission component 1504), to the network, a control element, associated with the frame, that indicates the sufficient quantity of PDUs to decode the frame.

In a fourth aspect, alone or in combination with one or more of the first through third aspects, process 1100 further includes receiving (e.g., using communication manager 140 and/or reception component 1502), from the network, feedback associated with the control element that indicates the sufficient quantity of PDUs to decode the frame.

In a fifth aspect, alone or in combination with one or more of the first through fourth aspects, the control element that indicates the sufficient quantity of PDUs to decode the frame is included in a plurality of PDUs transmitted to the network.

In a sixth aspect, alone or in combination with one or more of the first through fifth aspects, determining that the network has received the sufficient quantity of PDUs includes receiving (e.g., using communication manager 140 and/or reception component 1502) an indication from the network.

In a seventh aspect, alone or in combination with one or more of the first through sixth aspects, the indication from the network comprises a control element, an RLC control PDU, or a PDCP control PDU.

In an eighth aspect, alone or in combination with one or more of the first through seventh aspects, the indication from the network is received using a lower MCS than other transmissions from the network.

In a ninth aspect, alone or in combination with one or more of the first through eighth aspects, process 1100 further includes receiving (e.g., using communication manager 140 and/or reception component 1502), from the network, an instruction to enter a low-power mode based at least in part on an uplink buffer of the UE being empty, and entering the low-power mode (e.g., using communication manager 140 and/or power mode component 1512, depicted in FIG. 15) based at least in part on the instruction.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
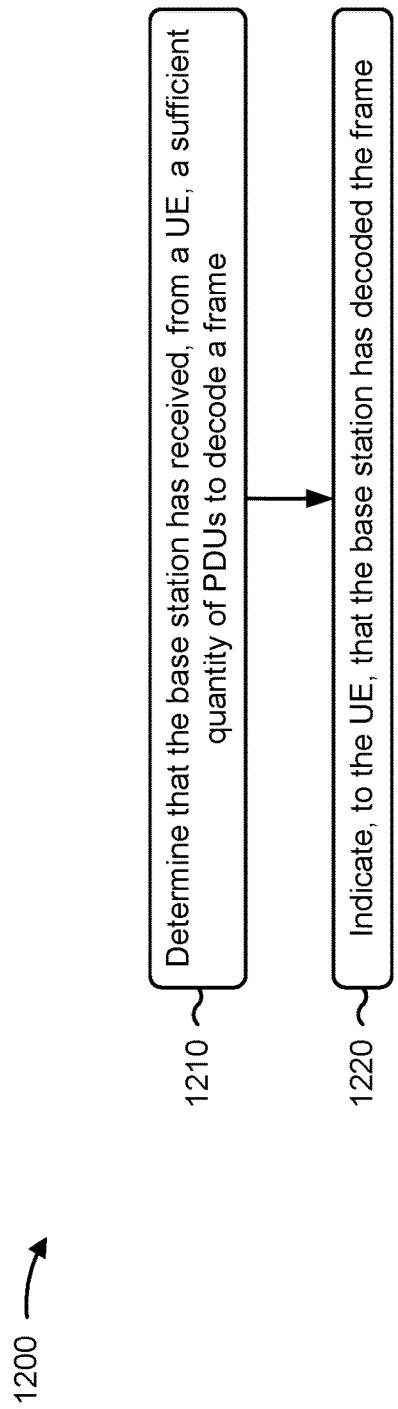

FIG. 12 is a diagram illustrating an example process 1200 performed, for example, by a base station, in accordance with the present disclosure. Example process 1200 is an example where the base station (e.g., base station 110 and/or apparatus 1600 of FIG. 16) performs operations associated with traffic management based on frame decoding.

As shown in FIG. 12, in some aspects, process 1200 may include determining that the base station has received, from a UE (e.g., UE 120 and/or apparatus 1500 of FIG. 15), a sufficient quantity of PDUs to decode a frame (block 1210). For example, the base station (e.g., using communication manager 150 and/or determination component 1608, depicted in FIG. 16) may determine that the base station has received, from a UE, a sufficient quantity of PDUs to decode a frame, as described herein.

As further shown in FIG. 12, in some aspects, process 1200 may include indicating, to the UE, that the base station has decoded the frame (block 1220). For example, the base station (e.g., using communication manager 150 and/or transmission component 1604, depicted in FIG. 16) may indicate, to the UE, that the base station has decoded the frame, as described herein.

Process 1200 may include additional aspects, such as any single aspect or any combination of aspects described below and/or in connection with one or more other processes described elsewhere herein.

In a first aspect, process 1200 further includes receiving (e.g., using communication manager 150 and/or reception component 1602, depicted in FIG. 16), from the UE, a control element, associated with the frame, that indicates the sufficient quantity of PDUs to decode the frame.

In a second aspect, alone or in combination with the first aspect, process 1200 further includes transmitting (e.g., using communication manager 150 and/or transmission component 1604), to the UE, feedback associated with the control element that indicates the sufficient quantity of PDUs to decode the frame.

In a third aspect, alone or in combination with one or more of the first and second aspects, the control element that indicates the sufficient quantity of PDUs to decode the frame is included in a plurality of PDUs received from the UE.

In a fourth aspect, alone or in combination with one or more of the first through third aspects, determining that the base station has received the sufficient quantity of PDUs includes comparing a quantity of the decoded PDUs to the sufficient quantity of PDUs to decode the frame.

In a fifth aspect, alone or in combination with one or more of the first through fourth aspects, indicating that the base station has decoded the frame includes transmitting a control element, an RLC control PDU, or a PDCP control PDU.

In a sixth aspect, alone or in combination with one or more of the first through fifth aspects, indicating that the base station has decoded the frame includes transmitting an indication using a lower MCS than other transmissions to the UE.

In a seventh aspect, alone or in combination with one or more of the first through sixth aspects, process 1200 further includes transmitting (e.g., using communication manager 150 and/or transmission component 1604), to the UE, an instruction to enter a low-power mode based at least in part on an uplink buffer of the UE being empty.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
FIGS. 13 and 14 are diagrams illustrating example processes associated with feedback management based on frame decoding, in accordance with the present disclosure.

FIG. 13 is a diagram illustrating an example process 1300 performed, for example, by a UE, in accordance with the present disclosure. Example process 1300 is an example where the UE (e.g., UE 120 and/or apparatus 1500 of FIG. 15) performs operations associated with feedback management based on frame decoding.

As shown in FIG. 13, in some aspects, process 1300 may include receiving, from a network (e.g., including base station 110 and/or apparatus 1600 of FIG. 16), an indication to disable some feedback to the network (block 1310). For example, the UE (e.g., using communication manager 140 and/or reception component 1502, depicted in FIG. 15) may receive, from a network, an indication to disable some feedback to the network, as described herein.

As further shown in FIG. 13, in some aspects, process 1300 may include refraining from transmitting one or more feedback signals based at least in part on the indication (block 1320). For example, the UE (e.g., using communication manager 140 and/or transmission component 1504, depicted in FIG. 15) may refrain from transmitting one or more feedback signals based at least in part on the indication, as described herein.

Process 1300 may include additional aspects, such as any single aspect or any combination of aspects described below and/or in connection with one or more other processes described elsewhere herein.

In a first aspect, refraining from transmitting the one or more feedback signals includes applying a retransmission timer of zero and an inactivity timer.

In a second aspect, alone or in combination with the first aspect, refraining from transmitting the one or more feedback signals includes receiving (e.g., using communication manager 140 and/or reception component 1502) an instruction to enter a low-power mode.

In a third aspect, alone or in combination with one or more of the first and second aspects, the indication to disable some feedback to the network is included in an RRC message.

In a fourth aspect, alone or in combination with one or more of the first through third aspects, refraining from transmitting the one or more feedback signals includes determining (e.g., using communication manager 140 and/or determination component 1508, depicted in FIG. 15) that a frame associated with the one or more feedback signals was successfully decoded.

In a fifth aspect, alone or in combination with one or more of the first through fourth aspects, the indication to disable some feedback to the network is included in DCI.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
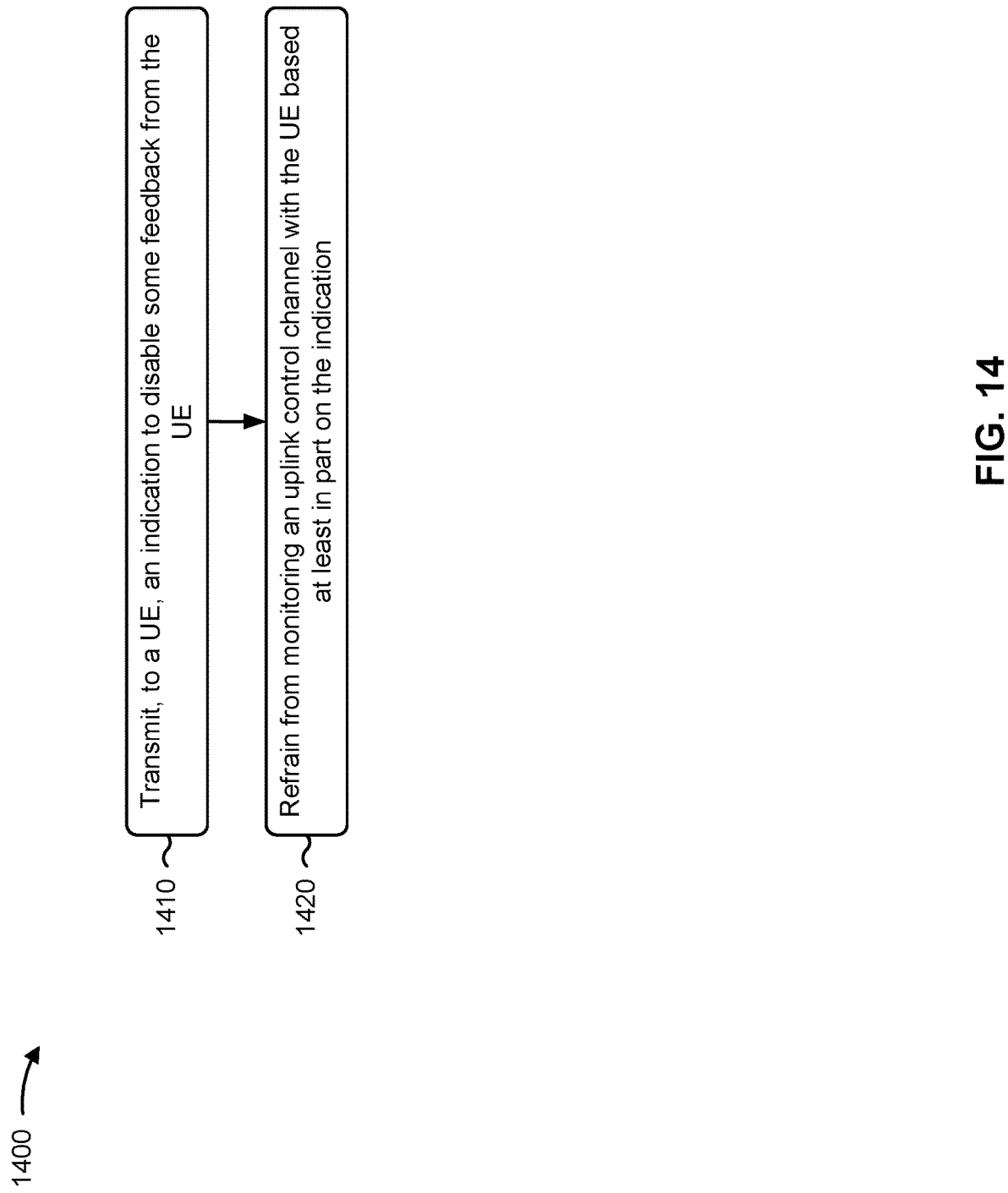

FIG. 14 is a diagram illustrating an example process 1400 performed, for example, by a base station, in accordance with the present disclosure. Example process 1400 is an example where the base station (e.g., base station 110 and/or apparatus 1600 of FIG. 16) performs operations associated with feedback management based on frame decoding.

As shown in FIG. 14, in some aspects, process 1400 may include transmitting, to a UE (e.g., UE 120 and/or apparatus 1500 of FIG. 15), an indication to disable some feedback from the UE (block 1410). For example, the base station (e.g., using communication manager 150 and/or transmission component 1604, depicted in FIG. 16) may transmit, to a UE, an indication to disable some feedback from the UE, as described herein.

As further shown in FIG. 14, in some aspects, process 1400 may include refraining from monitoring an uplink control channel with the UE based at least in part on the indication (block 1420). For example, the base station (e.g., using communication manager 150 and/or reception component 1602, depicted in FIG. 16) may refrain from monitoring an uplink control channel with the UE based at least in part on the indication, as described herein.

Process 1400 may include additional aspects, such as any single aspect or any combination of aspects described below and/or in connection with one or more other processes described elsewhere herein.

In a first aspect, refraining from monitoring the uplink control channel includes setting (e.g., using communication manager 150 and/or transmission component 1604) a retransmission timer of zero and an inactivity timer.

In a second aspect, alone or in combination with the first aspect, refraining from monitoring the uplink control channel includes transmitting (e.g., using communication manager 150 and/or transmission component 1604) an instruction to enter a low-power mode.

In a third aspect, alone or in combination with one or more of the first and second aspects, the indication to disable some feedback from the UE is included in an RRC message.

In a fourth aspect, alone or in combination with one or more of the first through third aspects, the indication to disable some feedback from the UE is included in DCI.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of a determination component 1508, a decoding component 1510, or a power mode component 1512, among other examples.

In some aspects, the apparatus 1500 may be configured to perform one or more operations described herein in connection with FIGS. 3-8. Additionally, or alternatively, the apparatus 1500 may be configured to perform one or more processes described herein, such as process 900 of FIG. 9, process 1100 of FIG. 11, process 1300 of FIG. 13, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

In some aspects, the determination component 1508 may determine that the apparatus 1500 has received (e.g., from the apparatus 1506) a sufficient quantity of PDUs to decode a frame. The determination component 1508 may include a modem, a demodulator, a MIMO detector, a receive processor, a controller/processor, a memory, or a combination thereof, of the UE described in connection with FIG. 2. Accordingly, the transmission component 1504 may indicate to the apparatus 1506 that the apparatus 1500 has decoded the frame. For example, the decoding component 1510 may decode the frame and indicate to the determination component 1508 that the apparatus 1500 has received the sufficient quantity of PDUs. The decoding component 1510 may include a modem, a demodulator, a MIMO detector, a receive processor, a controller/processor, a memory, or a combination thereof, of the UE described in connection with FIG. 2.

In some aspects, the reception component 1502 may receive (e.g., from the apparatus 1506) a configuration message associated with conditional deactivation of feedback. Accordingly, the transmission component 1504 may refrain from transmitting an acknowledgement signal to the apparatus 1506 to indicate that the apparatus 1500 has decoded the frame.

In some aspects, the reception component 1502 may refrain from monitoring for additional PDUs based at least in part on the transmission component 1504 indicating to the apparatus 1506 that the apparatus 1500 has decoded the frame. Additionally, in some aspects, the reception component 1502 may receive (e.g., from the apparatus 1506) an instruction to enter a low-power mode based at least in part on the transmission component 1504 indicating to the apparatus 1506 to indicate that the apparatus 1500 has decoded the frame. Accordingly, the power mode component 1512 may enter the low-power mode based at least in part on the instruction. The power mode component 1512 may include a transmit MIMO processor, a transmit processor, a MIMO detector, a receive processor, a controller/processor, a memory, or a combination thereof, of the UE described in connection with FIG. 2.

Additionally, or alternatively, the determination component 1508 may determine that a network has received, from the apparatus 1500, a sufficient quantity of PDUs to decode a frame. Accordingly, the transmission component 1504 may refrain from transmitting one or more additional PDUs associated with the frame.

In some aspects, the reception component 1502 may receive, from an application providing the frame, an indication of the sufficient quantity of PDUs to decode the frame. As an alternative, the determination component 1508 may determine the sufficient quantity of PDUs to decode the frame.

In some aspects, the transmission component 1504 may transmit (e.g., to the apparatus 1506) a control element, associated with the frame, that indicates the sufficient quantity of PDUs to decode the frame. In some aspects, the reception component 1502 may receive (e.g., from the apparatus 1506) an instruction to enter a low-power mode based at least in part on an uplink buffer of the apparatus 1500 being empty. Accordingly, the power mode component 1512 may enter the low-power mode based at least in part on the instruction.

Additionally, or alternatively, the reception component 1502 may receive (e.g., from the apparatus 1506) an indication to disable some feedback to the apparatus 1506. Accordingly, the transmission component 1504 may refrain from transmitting one or more feedback signals based at least in part on the indication.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

FIG. 16 is a diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604.

As further shown, the apparatus 1600 may include the communication manager 150. The communication manager 150 may include a determination component 1608, among other examples.

In some aspects, the apparatus 1600 may be configured to perform one or more operations described herein in connection with FIGS. 3-8. Additionally, or alternatively, the apparatus 1600 may be configured to perform one or more processes described herein, such as process 1000 of FIG. 10, process 1200 of FIG. 12, process 1400 of FIG. 14, or a combination thereof. In some aspects, the apparatus 1600 and/or one or more components shown in FIG. 16 may include one or more components of the base station described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the base station described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the base station described in connection with FIG. 2. In some aspects, the transmission component 1604 may be co-located with the reception component 1602 in a transceiver.

In some aspects, the determination component 1608 may determine that the apparatus 1606 has received, from the apparatus 1600, a sufficient quantity of PDUs to decode a frame. The determination component 1608 may include a modem, a demodulator, a MIMO detector, a modulator, a transmit MIMO processor, a transmit processor, a receive processor, a controller/processor, a memory, or a combination thereof, of the base station described in connection with FIG. 2. Accordingly, the transmission component 1604 may refrain from transmitting one or more additional PDUs associated with the frame.

In some aspects, the transmission component 1604 may transmit, to the apparatus 1606, a configuration message associated with conditional deactivation of feedback. Accordingly, the determination component 1608 may determine that the apparatus 1606 has received the sufficient quantity of PDUs by determining that the reception component 1602 did not receive an acknowledgement signal from the apparatus 1606. As an alternative, the reception component 1602 may receive, from the apparatus 1606, feedback signals associated with PDUs. Accordingly, the determination component 1608 may determine that the apparatus 1606 has received the sufficient quantity of PDUs by comparing a quantity of the feedback signals to the sufficient quantity of PDUs to decode the frame.

In some aspects, the reception component 1602 may receive, from an application providing the frame, an indication of the sufficient quantity of PDUs to decode the frame. As an alternative, the determination component 1608 may determine the sufficient quantity of PDUs to decode the frame.

In some aspects, the transmission component 1604 may transmit, to the apparatus 1606, an instruction to enter a low-power mode based at least in part on the determination component 1608 determining that the apparatus 1606 has received the sufficient quantity of PDUs.

Additionally, or alternatively, the determination component 1608 may determine that the apparatus 1600 has received (e.g., from the apparatus 1606) a sufficient quantity of PDUs to decode a frame. Accordingly, the transmission component 1604 may indicate, to the apparatus 1606, that the apparatus 1600 has decoded the frame.

In some aspects, the reception component 1602 may receive, from the apparatus 1606, a control element, associated with the frame, that indicates the sufficient quantity of PDUs to decode the frame.

In some aspects, the transmission component 1604 may transmit, to the apparatus 1606, an instruction to enter a low-power mode based at least in part on an uplink buffer of the apparatus 1606 being empty.

Additionally, or alternatively, the transmission component 1604 may transmit (e.g., to the apparatus 1606) an indication to disable some feedback from the apparatus 1606. Accordingly, the reception component 1602 may refrain from monitoring an uplink control channel with the apparatus 1606 based at least in part on the indication.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: determining that the UE has received, from a network, a sufficient quantity of protocol data units (PDUs) to decode a frame; and indicating, to the network, that the UE has decoded the frame.

Aspect 2: The method of Aspect 1, wherein determining that the UE has received the sufficient quantity of PDUs comprises receiving, from an application and at an access stratum of the UE, an indication that the frame has been decoded.

Aspect 3: The method of Aspect 1, wherein determining that the UE has received the sufficient quantity of PDUs comprises decoding, at an access stratum of the UE, the frame.

Aspect 4: The method of any of Aspects 1 through 3, further comprising: receiving, from the network, a configuration message associated with conditional deactivation of feedback, wherein indicating that the UE has decoded the frame comprises refraining from transmitting an acknowledgement signal to the network.

Aspect 5: The method of any of Aspects 1 through 3, wherein indicating that the UE has decoded the frame comprises transmitting an indication to the network.

Aspect 6: The method of any of Aspects 1 through 5, further comprising: refraining from monitoring for additional PDUs from the network based at least in part on indicating to the network that the UE has decoded the frame.

Aspect 7: The method of Aspect any of Aspects 1 through 6, further comprising: receiving, from the network, an instruction to enter a low-power mode based at least in part on indicating to the network that the UE has decoded the frame; and entering the low-power mode based at least in part on the instruction.

Aspect 8: A method of wireless communication performed by a base station, comprising: determining that a user equipment (UE) has received, from the base station, a sufficient quantity of protocol data units (PDUs) to decode a frame; and refraining from transmitting one or more additional PDUs associated with the frame.

Aspect 9: The method of Aspect 8, further comprising: transmitting, to the UE, a configuration message associated with conditional deactivation of feedback, wherein determining that the UE has received the sufficient quantity of PDUs comprises determining that the base station did not receive an acknowledgement signal from the UE.

Aspect 10: The method of Aspect 8, wherein determining that the UE has received the sufficient quantity of PDUs comprises receiving an indication from the UE.

Aspect 11: The method of any of Aspects 8 through 10, further comprising: receiving, from an application providing the frame, an indication of the sufficient quantity of PDUs to decode the frame.

Aspect 12: The method of any of Aspects 8 through 10, further comprising: determining, at an access stratum of the base station, the sufficient quantity of PDUs to decode the frame.

Aspect 13: The method of any of Aspects 8 through 12, further comprising: receiving, from the UE, feedback signals associated with PDUs, wherein determining that the UE has received the sufficient quantity of PDUs comprises comparing a quantity of the feedback signals to the sufficient quantity of PDUs to decode the frame.

Aspect 14: The method of any of Aspects 8 through 13, wherein the sufficient quantity of PDUs includes one or more PDUs that account for one or more erroneous decodings associated with the feedback signals.

Aspect 15: The method of any of Aspects 8 through 14, further comprising: transmitting, to the UE, an instruction to enter a low-power mode based at least in part on determining that the UE has received the sufficient quantity of PDUs.

Aspect 16: A method of wireless communication performed by a user equipment (UE), comprising: determining that a network has received, from the UE, a sufficient quantity of protocol data units (PDUs) to decode a frame; and refraining from transmitting one or more additional PDUs associated with the frame.

Aspect 17: The method of Aspect 16, further comprising: receiving, from an application providing the frame, an indication of the sufficient quantity of PDUs to decode the frame.

Aspect 18: The method of Aspect 16, further comprising: determining, at an access stratum of the UE, the sufficient quantity of PDUs to decode the frame.

Aspect 19: The method of any of Aspects 16 through 18, further comprising: transmitting, to the network, a control element, associated with the frame, that indicates the sufficient quantity of PDUs to decode the frame.

Aspect 20: The method of Aspect 19, further comprising: receiving, from the network, feedback associated with the control element that indicates the sufficient quantity of PDUs to decode the frame.

Aspect 21: The method of any of Aspects 19 through 20, wherein the control element that indicates the sufficient quantity of PDUs to decode the frame is included in a plurality of PDUs transmitted to the network.

Aspect 22: The method of any of Aspects 16 through 21, wherein determining that the network has received the sufficient quantity of PDUs comprises receiving an indication from the network.

Aspect 23: The method of Aspect 22, wherein the indication from the network comprises a control element, a radio link control (RLC) control PDU, or a packet data convergence protocol (PDCP) control PDU.

Aspect 24: The method of any of Aspects 22 through 23, wherein the indication from the network is received using a lower modulation and coding scheme (MCS) than other transmissions from the network.

Aspect 25: The method of any of Aspects 16 through 24, further comprising: receiving, from the network, an instruction to enter a low-power mode based at least in part on an uplink buffer of the UE being empty; and entering the low-power mode based at least in part on the instruction.

Aspect 26: A method of wireless communication performed by a base station, comprising: determining that the base station has received, from a user equipment (UE), a sufficient quantity of protocol data units (PDUs) to decode a frame; and indicating, to the UE, that the base station has decoded the frame.

Aspect 27: The method of Aspect 26, further comprising: receiving, from the UE, a control element, associated with the frame, that indicates the sufficient quantity of PDUs to decode the frame.

Aspect 28: The method of Aspect 27, further comprising: transmitting, to the UE, feedback associated with the control element that indicates the sufficient quantity of PDUs to decode the frame.

Aspect 29: The method of any of Aspects 27 through 28, wherein the control element that indicates the sufficient quantity of PDUs to decode the frame is included in a plurality of PDUs received from the UE.

Aspect 30: The method of any of Aspects 26 through 29, wherein determining that the base station has received the sufficient quantity of PDUs comprises comparing a quantity of the decoded PDUs to the sufficient quantity of PDUs to decode the frame.

Aspect 31: The method of any of Aspects 26 through 30, wherein indicating that the base station has decoded the frame comprises transmitting a control element, a radio link control (RLC) control PDU, or a packet data convergence protocol (PDCP) control PDU.

Aspect 32: The method of any of Aspects 26 through 31, wherein indicating that the base station has decoded the frame comprises transmitting an indication using a lower modulation and coding scheme (MCS) than other transmissions to the UE.

Aspect 33: The method of any of Aspects 26 through 32, further comprising: transmitting, to the UE, an instruction to enter a low-power mode based at least in part on an uplink buffer of the UE being empty.

Aspect 34: A method of wireless communication performed by a user equipment (UE), comprising: receiving, from a network, an indication to disable some feedback to the network; and refraining from transmitting one or more feedback signals based at least in part on the indication.

Aspect 35: The method of Aspect 34, wherein refraining from transmitting the one or more feedback signals comprises applying a retransmission timer of zero and an inactivity timer.

Aspect 36: The method of any of Aspects 34 through 35, wherein refraining from transmitting the one or more feedback signals comprises receiving an instruction to enter a low-power mode.

Aspect 37: The method of any of Aspects 34 through 36, wherein the indication to disable some feedback to the network is included in a radio resource control (RRC) message.

Aspect 38: The method of any of Aspects 34 through 37, wherein refraining from transmitting the one or more feedback signals comprises determining that a frame associated with the one or more feedback signals was successfully decoded.

Aspect 39: The method of any of Aspects 34 through 38, wherein the indication to disable some feedback to the network is included in downlink control information (DCI).

Aspect 40: A method of wireless communication performed by a base station, comprising: transmitting, to a user equipment (UE), an indication to disable some feedback from the UE; and refraining from monitoring an uplink control channel with the UE based at least in part on the indication.

Aspect 41: The method of Aspect 40, wherein refraining from monitoring the uplink control channel comprises setting a retransmission timer of zero and an inactivity timer.

Aspect 42: The method of any of Aspects 40 through 41, wherein refraining from monitoring the uplink control channel comprises transmitting an instruction to enter a low-power mode.

Aspect 43: The method of any of Aspects 40 through 42, wherein the indication to disable some feedback from the UE is included in a radio resource control (RRC) message.

Aspect 44: The method of any of Aspects 40 through 43, wherein the indication to disable some feedback from the UE is included in downlink control information (DCI).

Aspect 45: An apparatus for wireless communication at a device, comprising a processor; memory coupled with the processor; and instructions stored in the memory and executable by the processor to cause the apparatus to perform the method of one or more of Aspects 1-7.

Aspect 46: A device for wireless communication, comprising a memory and one or more processors coupled to the memory, the one or more processors configured to perform the method of one or more of Aspects 1-7.

Aspect 47: An apparatus for wireless communication, comprising at least one means for performing the method of one or more of Aspects 1-7.

Aspect 48: A non-transitory computer-readable medium storing code for wireless communication, the code comprising instructions executable by a processor to perform the method of one or more of Aspects 1-7.

Aspect 49: A non-transitory computer-readable medium storing a set of instructions for wireless communication, the set of instructions comprising one or more instructions that, when executed by one or more processors of a device, cause the device to perform the method of one or more of Aspects 1-7.

Aspect 50: An apparatus for wireless communication at a device, comprising a processor; memory coupled with the processor; and instructions stored in the memory and executable by the processor to cause the apparatus to perform the method of one or more of Aspects 8-15.

Aspect 51: A device for wireless communication, comprising a memory and one or more processors coupled to the memory, the one or more processors configured to perform the method of one or more of Aspects 8-15.

Aspect 52: An apparatus for wireless communication, comprising at least one means for performing the method of one or more of Aspects 8-15.

Aspect 53: A non-transitory computer-readable medium storing code for wireless communication, the code comprising instructions executable by a processor to perform the method of one or more of Aspects 8-15.

Aspect 54: A non-transitory computer-readable medium storing a set of instructions for wireless communication, the set of instructions comprising one or more instructions that, when executed by one or more processors of a device, cause the device to perform the method of one or more of Aspects 8-15.

Aspect 55: An apparatus for wireless communication at a device, comprising a processor; memory coupled with the processor; and instructions stored in the memory and executable by the processor to cause the apparatus to perform the method of one or more of Aspects 16-25.

Aspect 56: A device for wireless communication, comprising a memory and one or more processors coupled to the memory, the one or more processors configured to perform the method of one or more of Aspects 16-25.

Aspect 57: An apparatus for wireless communication, comprising at least one means for performing the method of one or more of Aspects 16-25.

Aspect 58: A non-transitory computer-readable medium storing code for wireless communication, the code comprising instructions executable by a processor to perform the method of one or more of Aspects 16-25.

Aspect 59: A non-transitory computer-readable medium storing a set of instructions for wireless communication, the set of instructions comprising one or more instructions that, when executed by one or more processors of a device, cause the device to perform the method of one or more of Aspects 16-25.

Aspect 60: An apparatus for wireless communication at a device, comprising a processor; memory coupled with the processor; and instructions stored in the memory and executable by the processor to cause the apparatus to perform the method of one or more of Aspects 26-33.

Aspect 61: A device for wireless communication, comprising a memory and one or more processors coupled to the memory, the one or more processors configured to perform the method of one or more of Aspects 26-33.

Aspect 62: An apparatus for wireless communication, comprising at least one means for performing the method of one or more of Aspects 26-33.

Aspect 63: A non-transitory computer-readable medium storing code for wireless communication, the code comprising instructions executable by a processor to perform the method of one or more of Aspects 26-33.

Aspect 64: A non-transitory computer-readable medium storing a set of instructions for wireless communication, the set of instructions comprising one or more instructions that, when executed by one or more processors of a device, cause the device to perform the method of one or more of Aspects 26-33.

Aspect 65: An apparatus for wireless communication at a device, comprising a processor; memory coupled with the processor; and instructions stored in the memory and executable by the processor to cause the apparatus to perform the method of one or more of Aspects 34-39.

Aspect 66: A device for wireless communication, comprising a memory and one or more processors coupled to the memory, the one or more processors configured to perform the method of one or more of Aspects 34-39.

Aspect 67: An apparatus for wireless communication, comprising at least one means for performing the method of one or more of Aspects 34-39.

Aspect 68: A non-transitory computer-readable medium storing code for wireless communication, the code comprising instructions executable by a processor to perform the method of one or more of Aspects 34-39.

Aspect 69: A non-transitory computer-readable medium storing a set of instructions for wireless communication, the set of instructions comprising one or more instructions that, when executed by one or more processors of a device, cause the device to perform the method of one or more of Aspects 34-39.

Aspect 70: An apparatus for wireless communication at a device, comprising a processor; memory coupled with the processor; and instructions stored in the memory and executable by the processor to cause the apparatus to perform the method of one or more of Aspects 40-44.

Aspect 71: A device for wireless communication, comprising a memory and one or more processors coupled to the memory, the one or more processors configured to perform the method of one or more of Aspects 40-44.

Aspect 72: An apparatus for wireless communication, comprising at least one means for performing the method of one or more of Aspects 40-44.

Aspect 73: A non-transitory computer-readable medium storing code for wireless communication, the code comprising instructions executable by a processor to perform the method of one or more of Aspects 40-44.

Aspect 74: A non-transitory computer-readable medium storing a set of instructions for wireless communication, the set of instructions comprising one or more instructions that, when executed by one or more processors of a device, cause the device to perform the method of one or more of Aspects 40-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:

determine that the UE has received, from a network, a sufficient quantity of protocol data units (PDUs) to decode a frame associated with one or more additional PDUs; and transmit, to the network, uplink control information (UCI) indicating that the UE has decoded the frame.

2. The apparatus of claim 1, wherein, to determine that the UE has received the sufficient quantity of PDUs, the one or more processors are configured to receive, from an application and at an access stratum of the UE, an indication that the frame has been decoded.

3. The apparatus of claim 1, wherein, to determine that the UE has received the sufficient quantity of PDUs, the one or more processors are configured to decode, at an access stratum of the UE, the frame.

4. The apparatus of claim 1, wherein the one or more processors are further configured to:

receive, from the network, a configuration message associated with conditional deactivation of feedback,
wherein the one or more processors are further configured to refrain from transmitting an acknowledgement signal to the network based at least in part on the UCI.

5. The apparatus of claim 1, wherein, to transmit the UCI, the one or more processors are configured to:

transmit the UCI with a lower modulation and coding scheme (MCS) than other transmissions to the network.

6. The apparatus of claim 1, wherein the one or more processors are further configured to:

refrain from monitoring for additional PDUs from the network based at least in part on the UCI.

7. The apparatus of claim 1, wherein the one or more processors are further configured to:

receive, from the network, an instruction to enter a low-power mode based at least in part on the UCI; and
enter the low-power mode based at least in part on the instruction.

8. An apparatus for wireless communication at a network entity, comprising:

one or more memories; and
one or more processors, coupled to the one or more memories, configured to:
receive uplink control information (UCI) indicating that a user equipment (UE) has received, from the network entity, a sufficient quantity of protocol data units (PDUs) to decode a frame associated with one or more additional PDUs; and
refrain from transmitting the one or more additional PDUs.

9. The apparatus of claim 8, wherein the one or more processors are further configured to:

transmit, to the UE, a configuration message associated with conditional deactivation of feedback; and
determine that the UE has received the sufficient quantity of PDUs to decode the frame based at least in part on the UCI,
wherein, to determine that the UE has received the sufficient quantity of PDUs to decode the frame, the one or more processors are configured to determine that the network entity did not receive an acknowledgement signal from the UE.

10. The apparatus of claim 8, wherein the one or more processors are further configured to:

transmit, to the UE, an indication to disable some feedback from the UE, wherein the indication to disable some feedback from the UE is included in a radio resource control (RRC) message or downlink control information (DCI); and
refrain from monitoring an uplink control channel with the UE based at least in part on the indication.

11. The apparatus of claim 8, wherein the one or more processors are further configured to:

receive, from the UE, feedback signals associated with PDUs; and
determine that the UE has received the sufficient quantity of PDUs to decode the frame based at least in part on the UCI,
wherein, to determine that the UE has received the sufficient quantity of PDUs to decode the frame, the one or more processors are configured to compare a quantity of the feedback signals to the sufficient quantity of PDUs to decode the frame.

12. The apparatus of claim 8, wherein the one or more processors are further configured to:

transmit, to the UE, an instruction to enter a low-power mode based at least in part on the UCI.

13. An apparatus for wireless communication at a user equipment (UE), comprising:

one or more memories; and
one or more processors, coupled to the one or more memories, configured to:
receive an indication that a network has received, from the UE, a sufficient quantity of protocol data units (PDUs) to decode a frame associated with one or more additional PDUs, wherein the indication includes one or more control PDUs; and
refrain from transmitting the one or more additional PDUs.

14. The apparatus of claim 13, wherein the one or more processors are further configured to:

receive, from an application providing the frame, an indication of the sufficient quantity of PDUs to decode the frame.

15. The apparatus of claim 13, wherein the one or more processors are further configured to:

determine, at an access stratum of the UE, the sufficient quantity of PDUs to decode the frame.

16. The apparatus of claim 13, wherein the one or more processors are further configured to:

transmit, to the network, a control element, associated with the frame, that indicates the sufficient quantity of PDUs to decode the frame.

17. The apparatus of claim 16, wherein the one or more processors are further configured to:

receive, from the network, feedback associated with the control element that indicates the sufficient quantity of PDUs to decode the frame.

18. The apparatus of claim 16, wherein the control element that indicates the sufficient quantity of PDUs to decode the frame is included in a plurality of PDUs transmitted to the network.

19. The apparatus of claim 13, wherein the one or more processors are further configured to determine that the network has received the sufficient quantity of PDUs to decode the frame based at least in part on the one or more control PDUs.

20. The apparatus of claim 13, wherein the one or more control PDUs correspond to at least one of: a radio link control (RLC) control PDU, or a packet data convergence protocol (PDCP) control PDU.

21. The apparatus of claim 19, wherein the indication from the network is received using a lower modulation and coding scheme (MCS) than the PDUs from the network associated with the frame.

22. The apparatus of claim 13, wherein the one or more processors are further configured to:
receive, from the network, an instruction to enter a low-power mode based at least in part on an uplink buffer of the UE being empty; and
enter the low-power mode based at least in part on the instruction.

23. An apparatus for wireless communication at a user equipment (UE), comprising:
one or more memories; and
one or more processors, coupled to the one or more memories, configured to:
transmit, to a network, uplink control information (UCI) indicating that the UE decoded a frame, the UE having decoded the frame before receiving all encoded packets associated with the frame;
receive, from the network, an indication to disable some feedback to the network in accordance with the UE indicating that the UE has decoded the frame; and
refrain from transmitting one or more feedback signals based at least in part on the indication.

24. The apparatus of claim 23, wherein, to refrain from transmitting the one or more feedback signals, the one or more processors are configured to apply a retransmission timer of zero and an inactivity timer.

25. The apparatus of claim 23, wherein, to refrain from transmitting the one or more feedback signals, the one or more processors are configured to receive an instruction to enter a low-power mode.

26. The apparatus of claim 23, wherein the indication to disable some feedback to the network is included in a radio resource control (RRC) message.

27. The apparatus of claim 26, wherein, to refrain from transmitting the one or more feedback signals, the one or more processors are configured to determine that the frame associated with the one or more feedback signals was successfully decoded.

28. The apparatus of claim 23, wherein the indication to disable some feedback to the network is included in downlink control information (DCI).

* * * * *